US011101705B2

United States Patent
Zeine et al.

(10) Patent No.: US 11,101,705 B2
(45) Date of Patent: Aug. 24, 2021

(54) TIMING ACQUISITION MODULE FOR WIRELESS POWER TRANSMISSION

(71) Applicant: Ossia Inc., Bellevue, WA (US)

(72) Inventors: Hatem Zeine, Woodinville, WA (US); Mark Zeid, Issaquah, WA (US); Ahmad Moghaddam, Kirkland, WA (US)

(73) Assignee: Ossia Inc., Redmond, WA (US)

( * ) Notice: Subject to any disclaimer, the term of this patent is extended or adjusted under 35 U.S.C. 154(b) by 162 days.

(21) Appl. No.: 16/244,013

(22) Filed: Jan. 9, 2019

(65) Prior Publication Data
US 2020/0220391 A1    Jul. 9, 2020

(51) Int. Cl.
*H02J 50/80* (2016.01)
*H02J 50/20* (2016.01)
*H02J 50/40* (2016.01)
*H04W 84/12* (2009.01)

(52) U.S. Cl.
CPC .............. *H02J 50/80* (2016.02); *H02J 50/20* (2016.02); *H02J 50/40* (2016.02); *H04W 84/12* (2013.01)

(58) Field of Classification Search
None
See application file for complete search history.

(56) References Cited

U.S. PATENT DOCUMENTS

| 2013/0177088 | A1* | 7/2013 | Lan | H04L 27/2647 375/259 |
| 2014/0314170 | A1* | 10/2014 | Plumb | H04L 25/4904 375/282 |
| 2016/0197522 | A1* | 7/2016 | Zeine | H02J 5/005 307/104 |
| 2017/0005520 | A1* | 1/2017 | Zeine | H02J 50/20 |
| 2017/0110910 | A1* | 4/2017 | Zeine | H02J 50/80 |
| 2017/0181191 | A1* | 6/2017 | Wen | H04W 52/325 |

* cited by examiner

*Primary Examiner* — Jared Fureman
*Assistant Examiner* — Joel Barnett
(74) *Attorney, Agent, or Firm* — Amin, Turocy & Watson, LLP

(57) ABSTRACT

Timing Acquisition Module (TAM) configured for use in or associated with a WTPS and associated methods, apparatus, and systems. The TAM is configured to receive encoded beacons broadcast by wireless power receiver clients requesting power on demand. The TAM decodes the encoded beacons to identify which client broadcast the beacon and notifies the WPTS that a client is requesting power, along with an identifier of that client. In response, the WPTS transmits wireless power signals to the client to service the power request. The WPTS and client may use separate beacons or signals to command the client to broadcast its WPTS beacon, whereby phases of the beacon signal are detected by antennas in the WPTS antenna array and processed to direct the wireless power signals from the WPTS to the client. Multiple apparatus including a combination of a WPTS and TAM may be implemented in a wireless power environment in a cooperative manner, enabling a client to move within the environment while supporting power on demand.

20 Claims, 15 Drawing Sheets

FIG. 7 *(Prior Art)*

TIMING ACQUISITION MODULE FOR WIRELESS POWER TRANSMISSION

BACKGROUND INFORMATION

The use of wireless communication in today's environments is ubiquitous. It seems that everyone has at least one "smart" wireless device, such as a smart phone or tablet, and many have other types of mobile computing devices, such as laptops, notebooks, Chromebooks, etc., that support wireless communication. In addition to cellular and mobile computing, wireless communication technologies are used for other purposes, such as audio systems, portable telephone systems, screen casting, and peer-to-peer communication to name a few.

Substantially all of the forgoing wireless devices are or can be powered by rechargeable batteries. Conventional rechargeable battery chargers require access to a power source such as an alternating current (AC) power outlet, which may not always be available or convenient. There have recently been techniques introduced for so-called "wireless" charging using magnetic or inductive charging-based solutions in which the wireless device is placed in close proximity to the charging unit. However, during charging the wireless device must (generally) be placed on the charging base.

Wireless power transmission at larger distances often use more advanced mechanisms, such as transmission via radio frequency (RF) signals, ultrasonic transmissions, and laser powering, to name a few, each of which presents a number of unique hurdles to commercial success. Of these, the most viable for commercial deployment are wireless power transmission systems (WPTS) employing RF signals. Such WPTS may (generally) utilize portions of licensed and unlicensed RF spectrum, including, but not limited to 2.4 GHz and 5/5.8 GHz radio bands.

In the context of RF transmission within a common residence, commercial building, or other habited environment, there are many reasons to limit the RF exposure levels of the transmitted signals. Consequently, power delivery via RF signals is constrained to relatively low power levels. Due to this low energy transfer rate, it is imperative that the system is efficient.

One technique for providing power to clients using RF signals is to use a time-slot based scheme, where RF power signals are directed toward specific clients during corresponding time slots. This approach includes a master bus controller directing clients when to beacon and directing the antenna elements of the WPTS when to take a sample of incoming beacons and determine the complex phase of the beacons received from the clients. The master bus controller then tells the antenna elements to compute the complex conjugate and store the result as a path back to the client for providing power signals to the clients. The master bus controller then directs the next time slot to the next client. While this system may enable the clients to receive the power signals at a specified time slot, this technique requires a large volume of communications between the master bus controller, the antenna boards, and the clients as timing of client communications must be individually coordinated by the master bus controller. Therefore, this technique decreases available time slots that may be used for additional power.

Other typical techniques may include the master bus controller pre-calculating a client power schedule for the subsequent time interval and sending the schedule to both the clients and antenna boards. In this method, the master bus controller allocates a start time and the prearranged beaconing schedule to determine which clients receive power signals and at which time slot. While this method is more time efficient than previous power beaconing models, time slots that may have been used for sending power signals are allocated to sending communications including the prearranged schedules. Additionally, this technique does not allow clients to have any control over which transmission system the client may receive power from and therefore, clients are unable to move or roam while listening for beacons or receiving power beacons. Essentially, the clients become active power receivers since they need to be aware of when the communication beacons are transmitted to be able to then harvest the power that was available based on the time schedule.

Accordingly, a need exists for technology that overcomes the demonstrated problems outlined above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
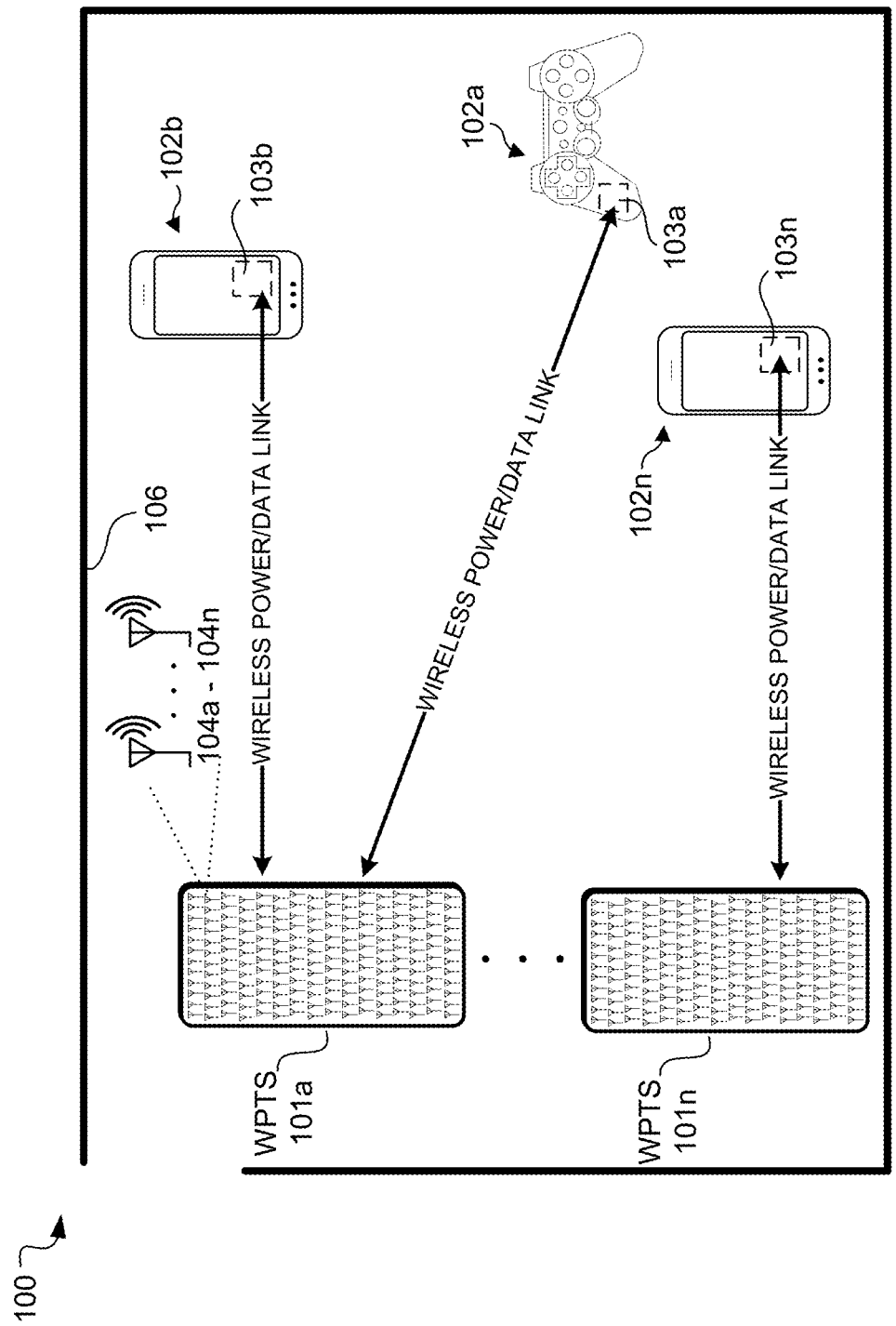
FIG. 1 depicts an example wireless power delivery environment illustrating wireless power delivery from one or more wireless power transmission systems to various wireless devices within the wireless power delivery environment in accordance with some embodiments.

Embodiments of a Timing Acquisition Module (TAM) configured for use in or associated with a WTPS and associated methods, apparatus, and systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

In accordance with aspects of the embodiments described herein, a TAM is disclosed for implementation with or integrated in a WPTS. The TAM provides facilities for enhancing the features and capabilities of a WPTS. For example, under some embodiments, wireless power receiver clients can request "power on demand" using a TAM, wherein the TAM, in conjunction with a WPTS, is used to control delivery of wireless power signals to wireless power receiver clients requesting power. Moreover, these enhancements may be implemented in shared wireless medium environments, such as Wi-Fi™ WLANs and in a manner that co-exists with existing equipment.

To better understand how to implement the embodiments of TAMs and related innovations disclosed herein, an overview of the operation and architecture of an exemplary WPTS is now presented.

I. Wireless Power Transmission System Overview/Architecture

FIG. 1 depicts a block diagram including an example wireless power delivery environment 100 illustrating wireless power delivery from one or more wireless power transmission systems (WPTS) 101a-n (also referred to as "wireless power delivery systems", "antenna array systems" and "wireless chargers") to various wireless devices 102a-n within the wireless power delivery environment 100, according to some embodiments. More specifically, FIG. 1 illustrates an example wireless power delivery environment 100 in which wireless power and/or data can be delivered to available wireless devices 102a-102n having one or more wireless power receiver clients 103a-103n (also referred to herein as "clients" and "wireless power receivers"). The wireless power receiver clients are configured to receive and process wireless power from one or more wireless power transmission systems 101a-101n. Components of an example wireless power receiver client 103 are shown and discussed in greater detail with reference to FIG. 4.

As shown in the example of FIG. 1, the wireless devices 102a-102n include mobile phone devices and a wireless game controller. However, the wireless devices 102a-102n can be any device or system that needs power and is capable of receiving wireless power via one or more integrated power receiver clients 103a-103n. As discussed herein, the one or more integrated power receiver clients receive and process power from one or more wireless power transmission systems 101a-101n and provide the power to the wireless devices 102a-102n (or internal batteries of the wireless devices) for operation thereof.

Each wireless power transmission system 101 can include multiple antennas 104a-n, e.g., an antenna array including hundreds or thousands of antennas, which are capable of delivering wireless power to wireless devices 102. In some embodiments, the antennas are adaptively-phased radio frequency (RF) antennas. The wireless power transmission system 101 is capable of determining the appropriate phases with which to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more receive power clients 103. As illustrated in the example of FIG. 1, power delivery antennas 104a-104n are shown. The power delivery antennas 104a are configured to provide delivery of wireless radio frequency power in the wireless power delivery environment. In some embodiments, one or more of the power delivery antennas 104a-104n can alternatively or additionally be configured for data communications in addition to or in lieu of wireless power delivery. The one or more data communication antennas are configured to send data communications to and receive data communications from the power receiver clients 103a-103n and/or the wireless devices 102a-102n. In some embodiments, the data communication antennas can communicate via Bluetooth™, Wi-Fi™ (including but not limited to Institute of Electrical and Electronics Engineers (IEEE) 802.11a, 802.11b, 802.11g, 802.11n, 802.11ac), ZigBee™, etc. Other data communication protocols are also possible.

Each power receiver client 103a-103n includes one or more antennas (not shown) for receiving signals from the wireless power transmission systems 101a-101n. Likewise, each wireless power transmission system 101a-101n includes an antenna array having one or more antennas and/or sets of antennas capable of emitting continuous wave or discrete (pulse) signals at specific phases relative to each other. As discussed above, each the wireless power transmission systems 101a-101n is capable of determining the appropriate phases for delivering the coherent signals to the power receiver clients 102a-102n. For example, in some embodiments, coherent signals can be determined by computing the complex conjugate of a received beacon (or calibration) signal at each antenna of the array such that the coherent signal is phased for delivering power to the particular power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101a-101n can be connected to a power source such as, for example, a power outlet or source connecting the wireless power transmission systems to a standard or primary alternating current (AC) power supply in a building. Alternatively, or additionally, one or more of the wireless power transmission systems 101a-101n can be powered by a battery or via other mechanisms, e.g., solar cells, etc.

The power receiver clients 102a-102n and/or the wireless power transmission systems 101a-101n are configured to operate in a multipath wireless power delivery environment. That is, the power receiver clients 102a-102n and the wireless power transmission systems 101a-101n are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the power receiver client.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a tablet, a PDA, a Blackberry device, a Treo, and/or an iPhone, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the power receiver clients 103a-103n can each include a data communication module for communication via a data channel. Alternatively, or additionally, the power receiver clients 103a-103n can direct the wireless devices 102.1-102.n to communicate with the wireless power transmission system via existing data communications modules. In some embodiments the beacon signal, which is primarily referred to herein as a continuous waveform, can alternatively or additionally take the form of a modulated signal.

Figure 2:
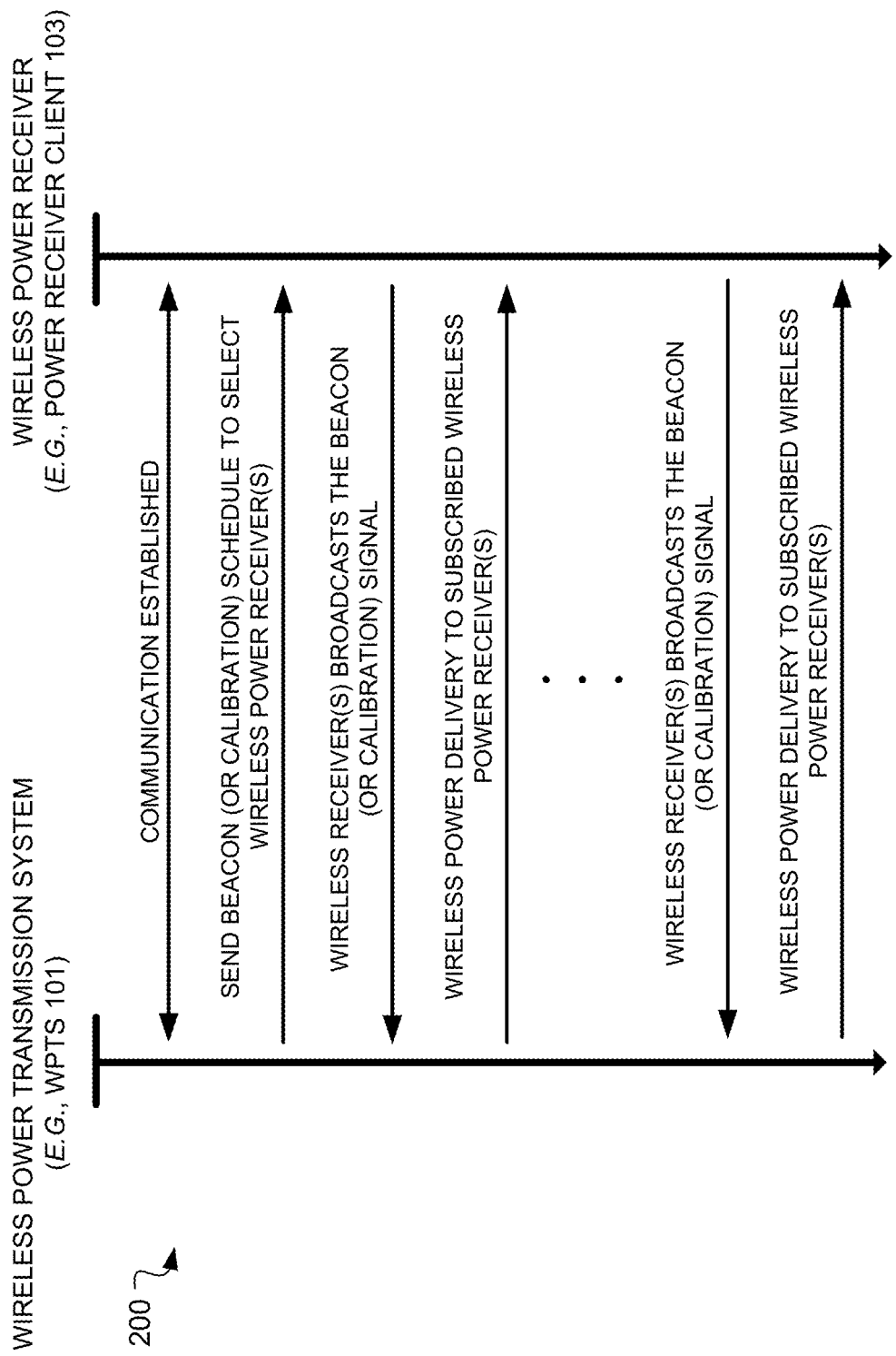
FIG. 2 depicts a sequence diagram illustrating example operations between a wireless power transmission system and a wireless receiver client for commencing wireless power delivery in accordance with some embodiments.

FIG. 2 is a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to a conventional approach using time-slots. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced (e.g., using time slots) among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select power receiver clients 103. The wireless power transmission system 101 can also send power transmission scheduling information so that the power receiver client 103 knows when to expect (e.g., a window of time) wireless power from the wireless power transmission system. The power receiver client 103 then generates a beacon (or calibration) signal and broadcasts the beacon during an assigned beacon transmission window (or time slice) indicated by the beacon schedule information, e.g., Beacon Beat Schedule (BBS) cycle. As discussed herein, the wireless power receiver client 103 include one or more antennas (or transceivers) which have a radiation and reception pattern in three-dimensional space proximate to the wireless device 102 in which the power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the power receiver client 103 via the same path over which the beacon signal was received from the power receiver client 103.

In some embodiments, the wireless power transmission system 101 includes many antennas; one or more of which are used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from the one or more antennas in such a way as to create an aggregate signal from the one or more of the antennas that approximately recreates the waveform of the beacon in the opposite direction. Said another way, the wireless power transmission system 101 can deliver wireless RF power to the client device via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client at the wireless power transmission system and, in turn, responding with wireless power directed to that particular client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 3.

Figure 3:
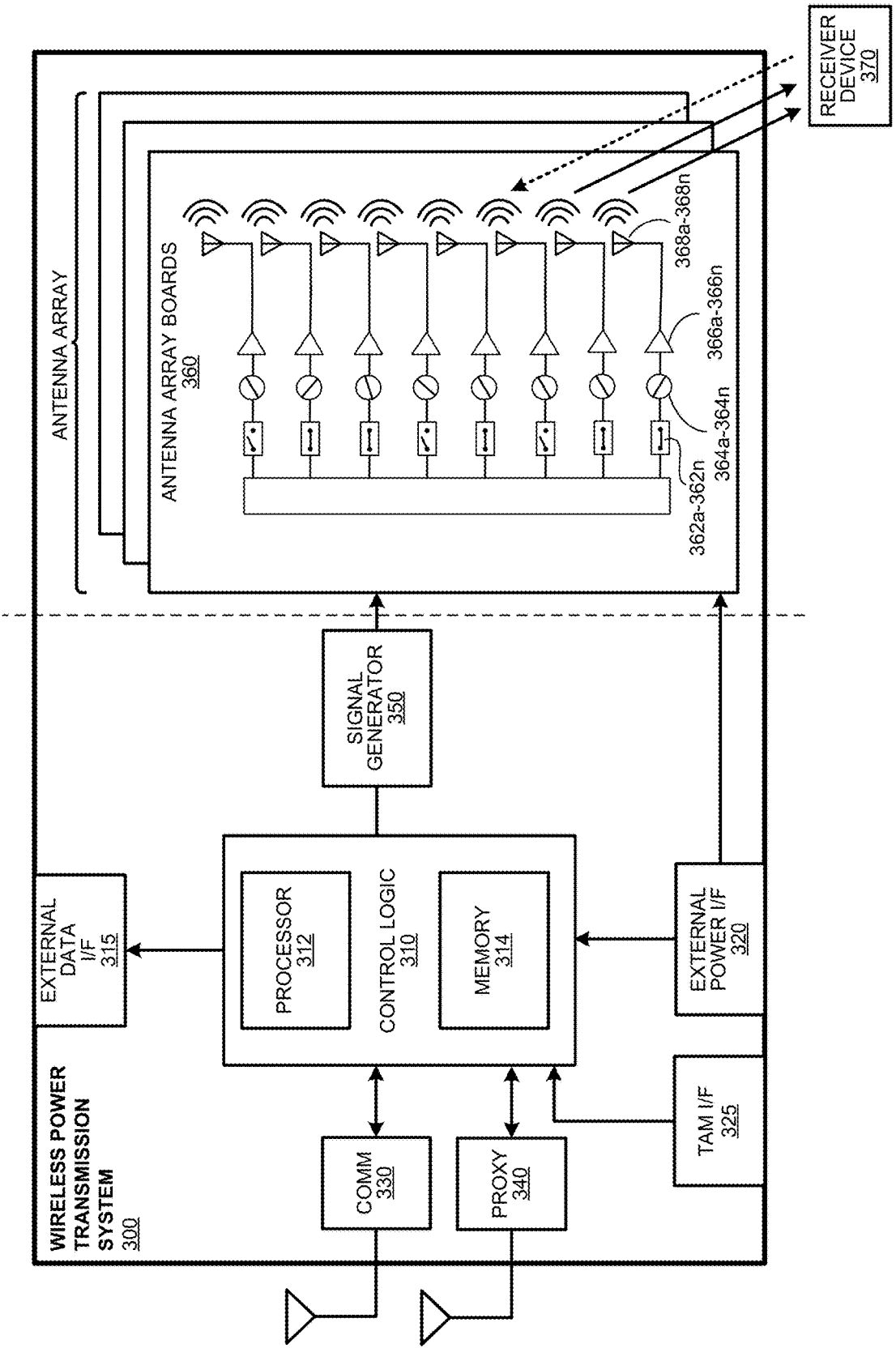
FIG. 3 depicts a block diagram illustrating example components of a wireless power transmission system in accordance with some embodiments.

FIG. 3 depicts a block diagram illustrating example components of a wireless power transmission system 300 in accordance with some embodiments. As illustrated in the example of FIG. 3, wireless power transmission system 300 includes a computer controller board (CCB) and multiple mezzanine boards that collectively comprise the antenna array. The CCB includes control logic 310, an external data interface (I/F) 315, an external power interface 320, a TAM interface 325, a communication block 330, a proxy 340, and a signal generator 350. Each antenna array board 360 includes switches 362a-362n, phase shifters 364a-364n, power amplifiers 366a-366n, and antenna arrays 368a-368n.

The configuration of wireless power transmission system 300 illustrated in FIG. 3 is exemplary and non-limiting, and may include additional components that are not shown for simplicity and clarity. In addition, some components may be omitted. For example, in some embodiments only one of communication block 330 or proxy 340 may be included.

The control logic 310 is configured to provide control and intelligence to the array components. The control logic 310 may comprise one or more processors (e.g., as depicted by processor 312, FPGAs, memory units (e.g., as depicted by memory 314), etc., and direct and control the various data and power communications. More generally, control logic may be implemented using embedded logic configured to implement the functionality described for control logic herein, including hardware-based embedded logic (e.g., FPGA, one or more digital signal processors (DSP), one or more application specific integrated circuits (ASICs), and a combination of hardware- and software-based embedded logic, such as one or more processing elements configured to executed software and/or firmware to implement the functionality described for control logic herein.

Signal generator 350 can compute a signal wave comprising power or data communications on a data carrier frequency. The signal wave can be Bluetooth™, Wi-Fi™, ZigBee™, etc., including combinations or variations thereof, as well as proprietary signal waves. In some embodiments, logic 310 can also determine a transmission configuration comprising a phase-shift based on the encoded beacon signal received from receiver device 370.

The communication block 330 can direct data communications on a data carrier frequency, such as the base signal clock for clock synchronization. The data communications can be Bluetooth™, Wi-Fi™, ZigBee™, etc., including combinations or variations thereof. Likewise, the proxy 340 can communicate with clients via data communications as discussed herein. The data communications can be, by way of example and not limitation, Bluetooth™ Wi-Fi™, ZigBee™, etc. Other communication protocols are possible.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided to via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoTs. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. In other embodiments, the external power interface 320 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

Switches 362a-362n may be activated to transmit power and receive client beacon signals when the switches are closed, as can be seen by the connected lines inside each of switches 362a-362n. On the other hand, switches 362a-362n may be deactivated for power transmission and client beacon reception when the switches are open, as can be seen by the disconnected lines inside each of switches 362a-362n. Additional components are also possible. For example, in some embodiments phase-shifters 364a-364n are included to change the phase of the frequency when transmitting power to receiver device 370. Phase shifter 364a-364n may transmit the power signal to receiver device 370 based on a complex conjugate of the phase included in the encoded beaconing signal from receiver device 370. The phase-shift may also be determined by processing the encoded beaconing signal received from receiver device 370 and identifying receiver device 370. Wireless power transmission system 300 may then determine a phase-shift associated with receiver device 370 to transmit the power signal.

In operation, the CCB, which controls the wireless power transmission system 300, receives power from a power source and is activated. The CCB then activates the proxy antenna elements on the wireless power transmission system and the proxy antenna elements enter a default "discovery" mode to identify available wireless receiver clients within range of the wireless power transmission system. For example, control logic 310 may identify a wireless receiver client within range of the wireless power transmission system, such as client 370 by receiving an encoded beacon signal initiated by the wireless receiver client 370 at antennas 368a-368n. In one embodiment, when the wireless receiver client 370 is identified (e.g., based on use a beaconing signal that is unique to that client), a set of antenna elements on the wireless power transmission system power on, enumerate, and (optionally) calibrate for wireless power transmission. At this point, control logic 310 may also be able to simultaneously receive additional beaconing signals from other wireless receiver clients at antennas 368a-368n.

Once the transmission configuration has been generated and instructions have been received from control logic 310, signal generator 350 generates and transfers the power waves to antenna boards 350. Based on the instruction and generated signals, power switches 362a-362n are opened or closed and phase shifters 364a-364n are set to the phase associated with the transmission configuration. The power signal is then amplified by power amplifiers 366a-366n and transmitted at an angle directed toward receiver device 370. As discussed herein, a set of antennas 368a-368n are simultaneously receiving beacon signals from additional receiver clients.

Figure 4:
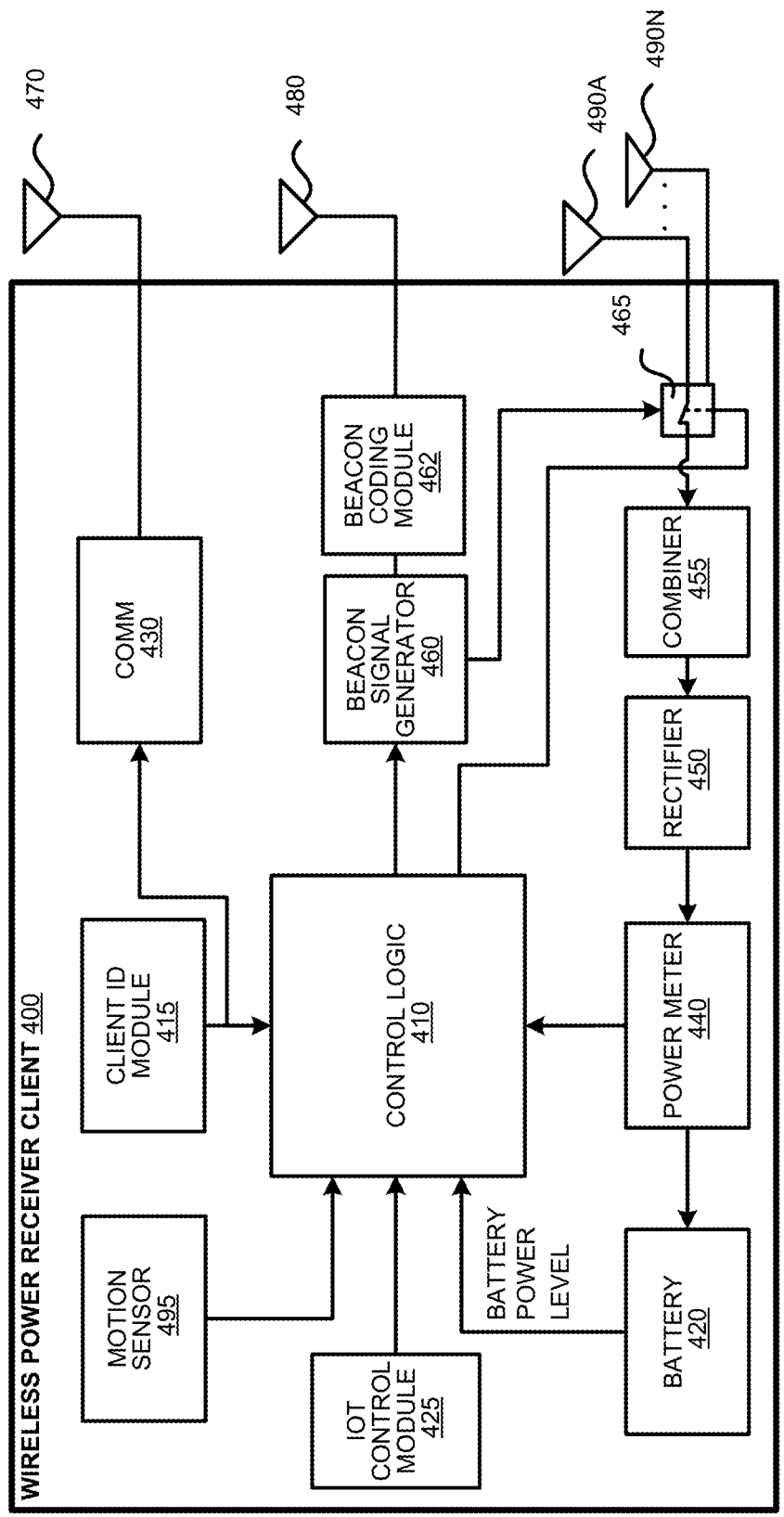
FIG. 4 depicts a block diagram illustrating example components of a wireless power receiver client in accordance with some embodiments.

FIG. 4 is a block diagram illustrating example components of a wireless power receiver client, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. In other embodiments, each antenna's power path can have its own rectifier 450 and the DC power out of the rectifiers is combined prior to feeding the power meter 440. The power meter 440 can measure the received power signal strength and provides the control logic 410 with this measurement.

Battery 420 can include protection circuitry and/or monitoring functions. Additionally, the battery 420 can include one or more features, including, but not limited to, current limiting, temperature protection, over/under voltage alerts and protection, and coulomb monitoring.

The control logic 410 can receive the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown as charged by, and providing power to, the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client is embedded, usage information of the device in which the wireless power receiver client is embedded, power levels of the battery or batteries of the device in which the wireless power receiver client is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the power receiver client in a wireless power delivery environment. For example, the ID can be transmitted to one or more wireless power transmission systems when communication is established. In some embodiments, power receiver clients may also be able to receive and identify other power receiver clients in a wireless power delivery environment based on the client ID.

An optional motion sensor 495 can detect motion and signal the control logic 410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 5A:
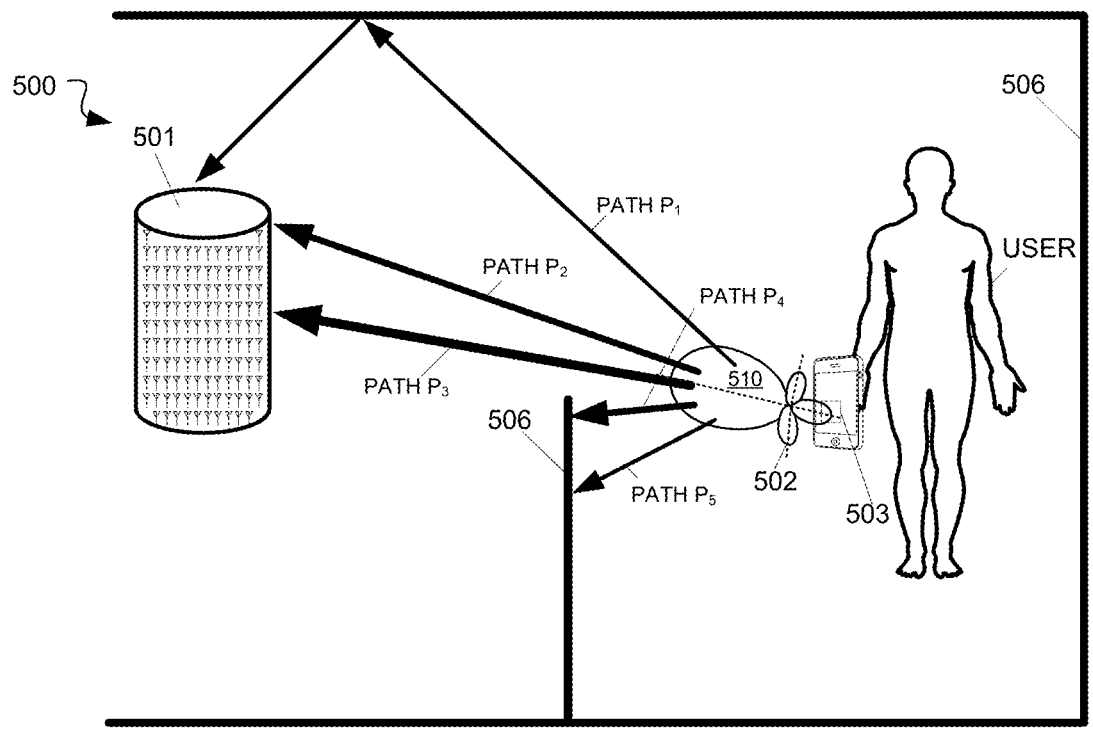
FIGS. 5A and 5B depict diagrams illustrating an example multipath wireless power delivery environment in accordance with some embodiments.
Figure 5B:
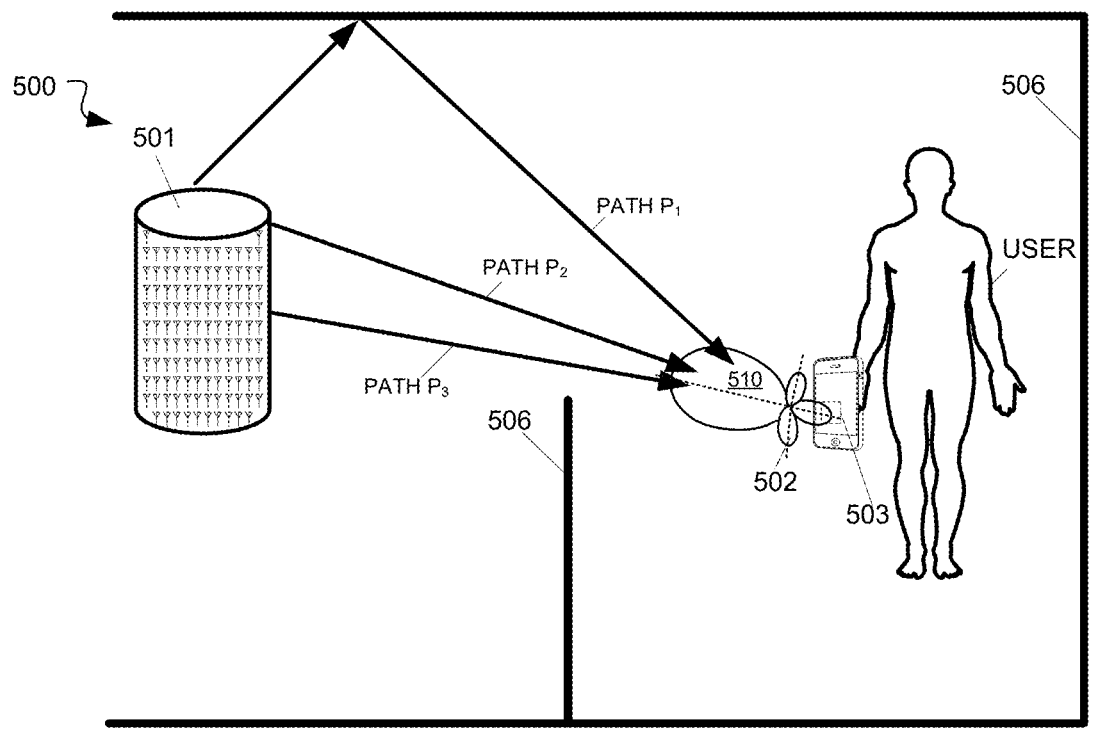

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 102. The one or more antennas (or transceivers) can be wholly or partially included as part of the wireless device 102 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., RSSI, depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments the beacon signals are directionally transmitted in this manner to, for example, avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetics. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receiver, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment.

In retrodirective wireless power delivery environments, wireless power receivers generate and send beacon (or calibration) signals that are received by an array of antennas of a wireless power transmission system. The beacon signals provide the charger with timing information for wireless power transfers, and also indicate directionality of the incoming signal. As discussed herein, this directionality information is employed when transmitting in order to focus energy (e.g., power wave delivery) on individual wireless power receiver clients. Additionally, directionality facilitates other applications such as, for example, tracking device movement.

In some embodiments, wireless power receiver clients in a wireless power delivery environment are tracked by a wireless power transmission system using a three dimensional angle of incidence of an RF signal (at any polarity) paired with a distance determined by using an RF signal strength or any other method. As discussed herein, an array of antennas capable of measuring phase (e.g., the wireless power transmission system array) can be used to detect a wavefront angle of incidence. A distance to the wireless power receiver client can be determined based on the angle from multiple array segments. Alternatively, or additionally, the distance to the wireless power receiver client can be determined based on power calculations.

In some embodiments, the degree of accuracy in determining the angle of incidence of an RF signal depends on a size of the array of antennas, a number of antennas, a number of phase steps, method of phase detection, accuracy of distance measurement method, RF noise level in environment, etc. In some embodiments, users may be asked to agree to a privacy policy defined by an administrator for tracking their location and movements within the environment. Furthermore, in some embodiments, the system can use the location information to modify the flow of information between devices and optimize the environment. Additionally, the system can track historical wireless device location information and develop movement pattern information, profile information, and preference information.

Figure 6:
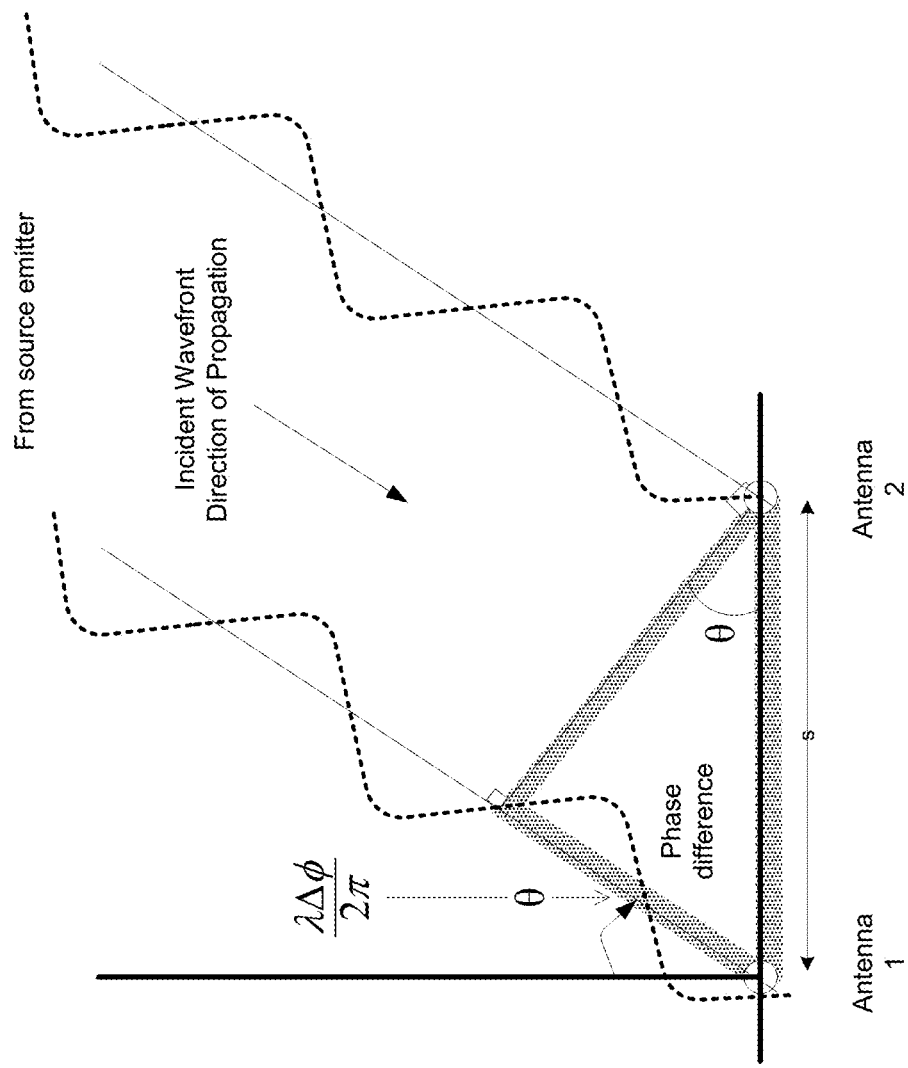
FIG. 6 is a diagram illustrating an example determination of an incident angle of a wavefront in accordance with some embodiments.

FIG. 6 is a diagram illustrating an example determination of an incident angle of a wavefront, according to some embodiments. By way of example and not limitation, the incident angle of a wavefront can be determined using an array of transducers based on, for example, the received phase measurements of four antennas for omnidirectional detection, or three antennas can be used for detecting the wavefront angle on one hemisphere. In these examples, the transmitting device (i.e., the wireless device) is assumed to be on a line coming from the center of the three or more antennas out to infinity. If the at least three different antennas are located a sufficient known distance away and are also used to determine incident wave angle, then the convergence of the two lines plotted from the phase-detecting antennas is the location of the device. In the example of FIG. 6, $\theta = \sin^{-1}(\lambda \Delta \phi / 2\pi s)$, where $\lambda$ is the wavelength of the transmitted signal, and $\Delta \phi$ is the phase offset in radians and s is the inter-element spacing of the receiving antennas.

If less than one wavelength of antennas spacing is used between two antennas, an unambiguous two-dimensional (2D) wavefront angle can be determined for a hemisphere. If three antennas are used, an unambiguous three-dimensional (3D) angle can be determined for a hemisphere. In some embodiments, if a specified number of antennas, e.g., four antennas are used, an unambiguous 3D angle can be determined for a sphere. For example, in one implementation, 0.25 to 0.75 wavelength spacing between antennas can be used. However, other antenna spacing and parameters may be used. The antennas described above are omnidirectional antennas which each cover all polarities. In some embodiments, in order to provide omnidirectional coverage at every polarity, more antennas may be needed depending on the antenna type/shape/orientation.

Figure 7:
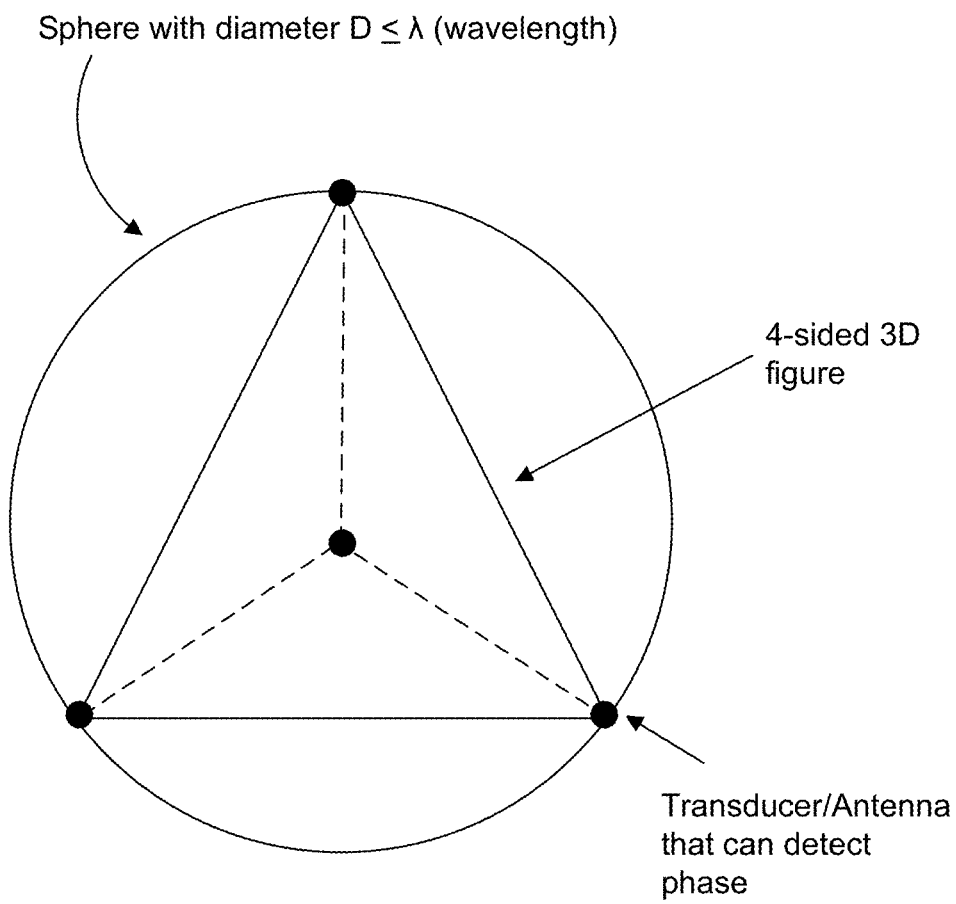
FIG. 7 is a diagram illustrating an example minimum omnidirectional wavefront angle detector in accordance with some embodiments.

FIG. 7 is a diagram illustrating an example minimum omnidirectional wavefront angle detector, according to some embodiments. As discussed above, the distance to the transmitter can be calculated based on received power compared to a known power (e.g., the power used to transmit), or utilizing other distance determination techniques. The distance to the transmitting device can be combined with an angle determined from the above-described process to determine device location. In addition, or alternatively, the distance to the transmitter can be measured by any other means, including measuring the difference in signal strength between sent and received signals, sonar, timing of signals, etc.

When determining angles of incidence, a number of calculations must be performed in order to determine receiver directionality. The receiver directionality (e.g., the direction from which the beacon signal is received) can comprise a phase of the signal as measured at each of multiple antennas of an array. In an array with multiple hundreds, or even thousands, or antenna elements, these calculations may become burdensome or take longer to compute than desirable. In order to address reduce the burden of sampling a single beacon across multiple antenna elements and determining directionality of the wave, a method is proposed that leverages previously calculated values to simplify some receiver sampling events.

Additionally, in some cases it is extremely beneficial to determine if a receiver within the charging environment, or some other element of the environment, is moving or otherwise transitory. Thus, rather than the above attempt to determine actual or exact location, the utilization of pre-calculated values may be employed to identify object movement within the environment. Each antenna unit automatically and autonomously calculates the phase of the incoming beacon. The Antennas (or a representative subset of antennas) then report the detected (or measured phases up to the master controller for analysis). To detect movement, the master controller monitors the detected phases over time, looking for a variance to sample for each antenna.

Timing Acquisition Module

Figure 8:
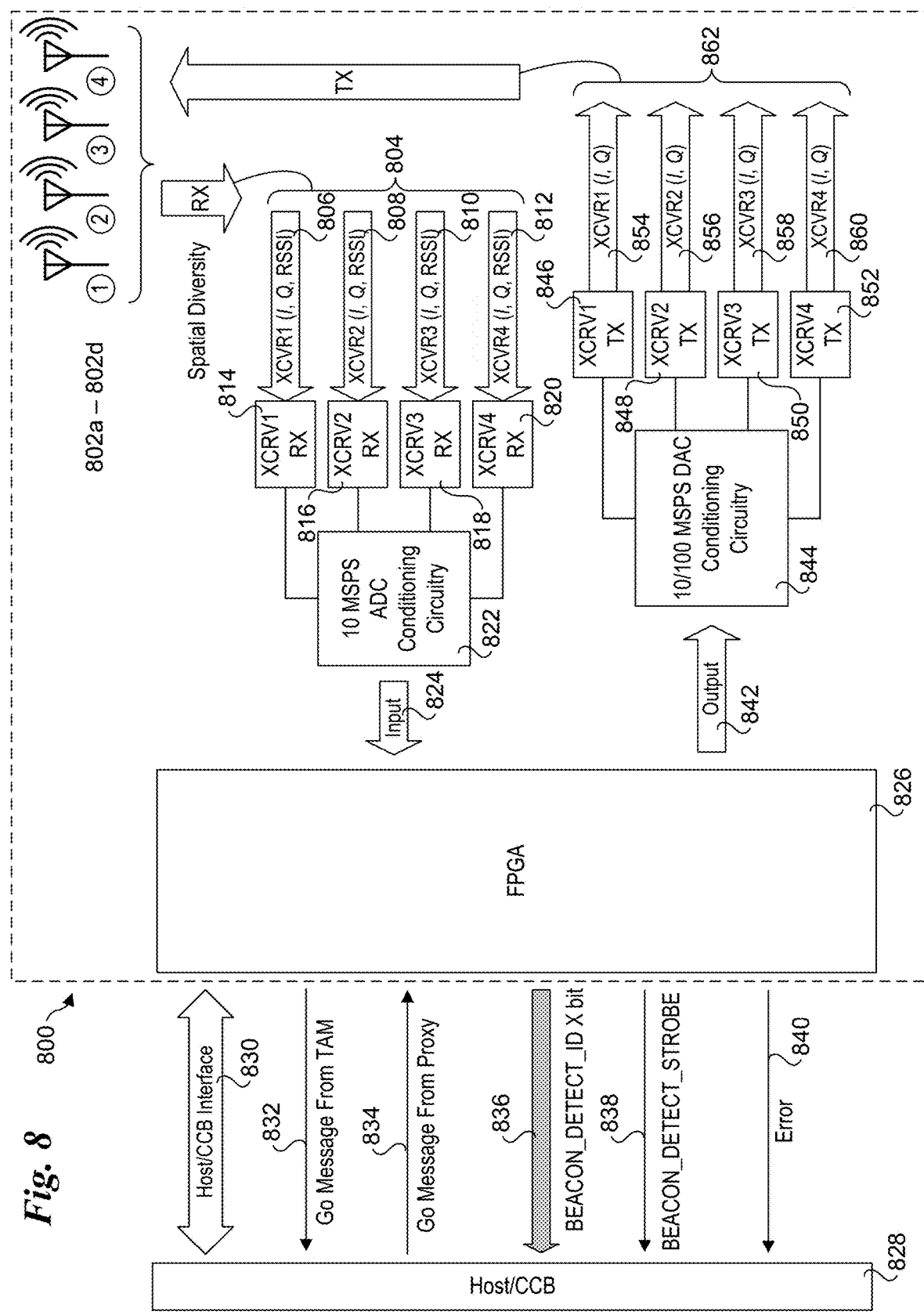
FIG. 8 is a schematic diagram of a Timing Acquisition Module (TAM) and host/CCB interface, according to one embodiment.

In embodiments now described, a Timing Acquisition Module (TAM) is used to detect the presence of encoded beacons transmitted from wireless power receiver clients and/or client host devices and generate key timing signals and triggers (e.g., Proxy GO signal, Encoded Beacon Detect, Error Flags etc.) to a Host/CCB (computer control board) used by the WPTS. FIG. 8 shows and exemplary embodiment of a TAM 800. In the illustrative configuration of FIG. 8, TAM 800 includes four antennas 802a-802d, also labeled herein using encircled numbers '1', '2', '3', '4'. Each of antennas 802a-802d is configured to receive signals from various devices in which wireless power receiver clients are installed or integrated therein. In some embodiments, the data link is implemented using Wi-Fi™ (including but not limited to IEEE 802.11a, 802.11b, 802.11g, 802.11n, 802.11ac). In some embodiments, the Physical Layer (PHY) of an IEEE 802.11-based standard is used for TAM beaconing, without using the MAC (Media Access Channel) protocol for the 802.11-based standard (rather, a custom Layer-2 protocol is implemented).

The wireless propagation channel can be very noisy and the signal transmitted over a wireless communication link is susceptible to fading, co-channel interference, blockage, path loss effects and multi-path. These problems may be reduced by providing spatial diversity using multiple antennas, which provider greater immunity to the fading, blockage and offers high quality link when compared to single a channel antenna system. Accordingly, antennas 802a-802d are configured to provide such spatial diversity. Some degree of spatial diversity may be achieved location, i.e., by spacing the antennas apart. Additional spatial diversity may be achieved by other measures, such as orientation of the antennas, or using different antennas polarization. For example, in one embodiment two of the antennas are horizontally polarized, which the other two antennas are vertically polarized. However, this is merely one non-limiting example, as various antenna orientations and spacing may also be used. In addition, more or less than four antennas may be used, depending on the particular implementation and associated factors, such as how many clients the system is to support and the wireless medium environment in which the system will be operating.

The signals received by the antennas are depicted as RX (receiver) signals 804. A separate signal is received from each antenna, as depicted by RX signals 806, 808, 810, and 812. RX signals 806, 808, 810 and 812 are respectively received at receivers 814, 816, 818, and 820 of transceivers XCRV1, XCRV2, XCRV3, and XCRV4. Accordingly, RX signals 806, 808, 810, and 812 are also labeled XCRVn (I, Q, RSSI), where n is the antenna number, I and Q represent the in-phase and quadrature components I(t) and Q(t) of the modulated RF signal, and RSSI is the received signal strength indicator, which is representative of the power of the received RF signal. The use of RSSI is used in FIG. 8 for illustrative purposes, as each of RX signals 806, 808, 810 and 812 will have a signal strength (an associated power level) that may (generally) vary, and the RSSI would be derived using well-known techniques by applicable hardware, as will be recognized by those skilled in the wireless communication art.

Each of receivers 814, 816, 818, and 820 is configured to process the RX signal it receives and output I(t) and Q(t) RF components in analog form. The I(t) and Q(t) RF components are then processed by 10 MSPS (Mega-Samples Per Second) analog-to-digital (ADC) conditioning circuitry 822, which converts the analog I(t) and Q(t) RF components into digital waveforms. The digitized I(t) and Q(t) RF components are then received as input 824 by a Field Programmable Gate Array (FPGA) 826, where they are processed, as described below.

FPGA 826 is programmed to implement various functions and algorithms, including providing communication functions with the wireless power receiver client devices and interacting with a host/computer control board (CCB) 828, which is facilitated by a host/CCB interface 830. Host/CCB interface 830 is used to send commands/data and notification signals between a master controller/host in the WPTS (depicted as host/CCB 828) and the TAM via commands/data and signals received from and sent to FPGA 826. These commands/data and signals include a Go Message from TAM 832, a Go Message from Proxy 834, a BEACON_DETECT_ID bus 836, a BEACON_DETECT_STROBE signal 838 received from host/CCB 828, and an error signal 840 sent to host/CCB 828. In addition to the signals/messages shown, host/CCB interface 830 may provide a communication channel between a TAM and a host/CCB to enable various types of data and messages to be exchanged between the TAM and the host/CCB.

BEACON_DETECT_STROBE signal 838 is a single line that strobes the presence of an encoded beacon. BEACON_DETECT_ID bus 836 is a multi-bit parallel bus used to convey binary encoded client preambles and message. In one embodiment, BEACON_DETECT_ID bus 836 is six bits wide; however, this is merely exemplary and non-limiting. Error signal 840 is used to provide error notification interrupts in case the encoded beacon is not detected given certain rules. An optional ACQUIRED_DIFFRENTIAL_CLOCK (not shown) may be included as a primary unit clock being regenerated from a Timing Channel Pilot.

In addition to the commands/data and signals illustrated in FIG. 8, host/CCB interface 830 include various other signals/lines that are not shown. In one embodiment, these include a CCB_TAM_INT, which is a digital line from CCB to TAM for timing critical requests; a TAM_CCB_INT, which is a digital line from the TAM to CCB to notify interrupt and error events; a Master Out Slave In (MOSI) input to the TAM; a Master In Slave Out (MISO) output from the TAM, and a Chip/Slave Select signal to qualify transactions. Various clock signals may also be used, including differential digital clocks and differential RF clocks.

FPGA 826 also provides output 842 for communicating with the client devices. output 842 is received as digital data by a 10/100 MSPS digital-to-analog convertor (DAC) conditioning circuitry 844. 10/100 MSPS DAC conditioning circuitry 844 provides four outputs that are respectively received by transmitters (TX) 846, 848, 850, and 852 of transceivers XCRV1, XCRV2, XCRV3, and XCRV4. Transmitters 846, 848, 850, and 852 respectively output transmitter signals 854, 856, 858, and 860, which are received at and broadcast by antennas 802*a*-802*d*.

Figure 9:
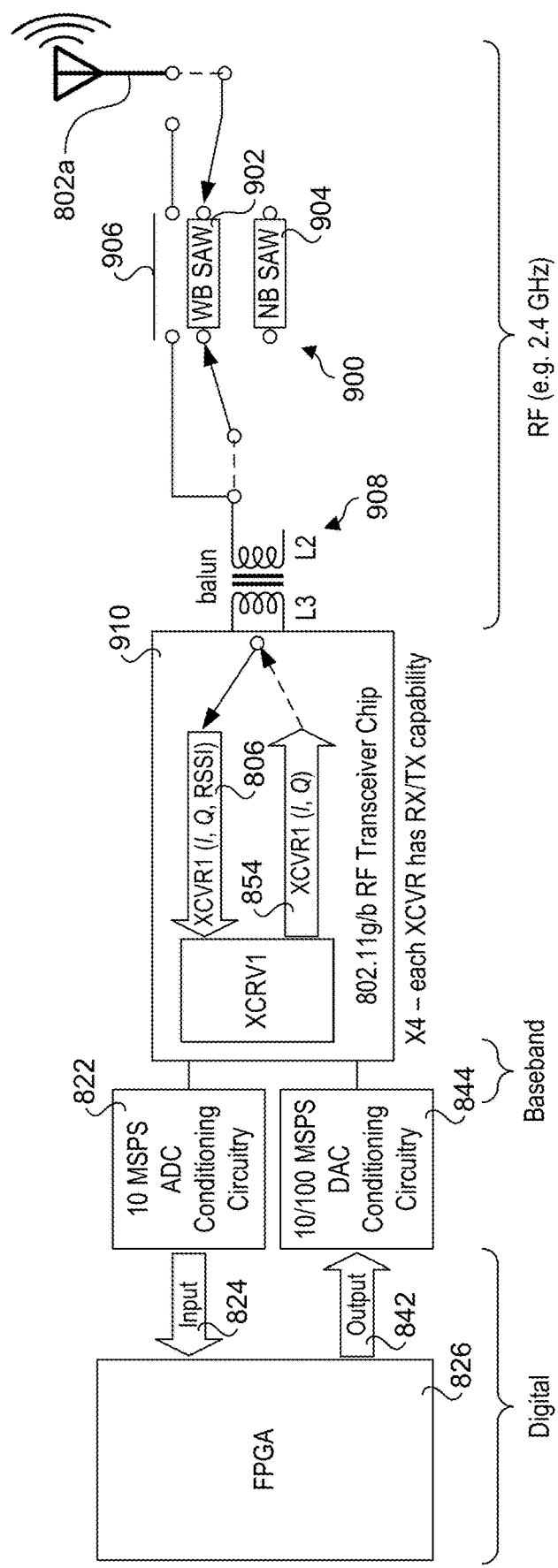
FIG. 9 is a schematic diagram illustrating further details of the receiver and transmitter circuitry for the TAM of FIG. 8, according to one embodiment.

FIG. 9 illustrates further detail of the RF signal processing performed by the TAM, according to one embodiment. In this example, only the signals for a single antenna (802*a*) are depicted; however, it will be understood that similar components and processing would exist for each of the other antennas 802*b*, 802*c*, and 802*d*.

A switch 900 is configurable to pass RF signals received from antenna 802*a* through a wideband (WB) SAW filter 902, a narrowband (NB) SAW filter 904, or a pass-through 906. Alternatively, a wideband or narrowband SAW filter can be used without switching, or no SAW filter is used. A balun 908 (balanced to unbalanced) is used to couple the single-ended RF signal to a double-ended signal that is received as an input by a transceiver chip 910.

In the illustrated embodiment, transceiver chip is an IEEE 802.11g/b RF transceiver chip. Alternatively, RF transceiver chips that support other IEEE 802.11 standards (alone or in combination) may be used, including one or more of 802.11a, 802.11b, 802.11g, 802.11n, 802.11ac standards. IEEE 802.11 transceiver chips are available from various vendors, including Maxim, Cypress Semiconductor, Marvell, and Texas Instruments (as well as others). In one embodiment, IEEE 802.11g/b RF transceiver chip 910 is a Maxim series 2830 RF transceiver chip. Since this Maxim chip provides on-chip monolithic filters for both the receiver and transmitter, it may be used without a SAW filter. In some embodiments, only the PHY of a IEEE 802.11 transceiver chip is used for some purposes, such as beaconing. (It is noted that some IEEE 802.11 transceiver chips provide both PHY and MAC layer circuitry and associated functionality, while other IEEE 802.11 transceiver chips, such as the Maxim series 2830 RF transceiver chip, only provide PHY layer circuitry.)

10 MSPS ADC Conditioning Circuitry 822 may be generally implemented using a 10 MSPS ADC chip available from various vendors. Such chips will also include appropriate signal conditioning circuitry. In one embodiment, a Linear Technology 12 or 14 bit 10 MSPS ADC chip is used. It is further noted that use of a 10 MSPS ADC is merely exemplary, as other sampling rates, including higher sampling rates, may also be used.

TAM and WPTS Encoded Beacons

In some embodiments, encoded beacons are transmitted by wireless power receiver clients to identify the wireless power receiver clients with the TAM and/or WPTS. A WPTS may also broadcast signals and/or messages that are encoded to enable the signals and/or messages to be targeted to specific wireless power receiver clients. Under implementations in which encoded beacons are used to communication with the TAM and (separately) the WPTS, the encoded beacons for the same client may use the same codes in some embodiments, or different codes in other embodiments. In addition, the beacons used by a client to beacon to the WPST and to beacon to the TAM may use different RF radio bands and/or channels.

In the case of an IEEE 802.11 implementation, a center frequency of 2.4 GHz (802.11b/g/n/ax) or 5 GHz (802.11a/h/j/n/ac/ax) is usually be used (noting there are IEEE 802.11 standards defining use of other center frequencies). Using the Nyquist rate, at a 1 MBPS encoded beacon rate, the minimum sampling frequency is 2 MSPS. The use of components supporting higher sampling rates (e.g., 10 MSPS DACs) improves the acquisition processing in the presence of pulse shaping. In one embodiment, the encoded beacon code length is settable to 16, 32, and 64 bits. In another embodiment, encoded beacon code lengths of 128 bits are supported.

Generally, various types of codes may be used; however it is preferable to use codes that are more detectable, particularly in harsh RF environments. In one embodiment, the encoded beacon codes are built using Barker codes, which are codes that are known for their detectability and cross-correlation properties. For example, any of a 16-bit, 32-bit, 64-bit, or 128-bit code could be built using a combination of Barker codes that are concatenated. Other codes may be build using Barker code sequences interspersed with non-Barker code sequences. A listing of some known Barker codes is shown in TABLE 1 below.

TABLE 1

| Length | Codes | Sidelobe level ratio |
|---|---|---|
| 2 | +1 −1      +1 +1 | −6 dB |
| 3 | +1 +1 −1 | −9.5 dB |
| 4 | +1 +1 −1 +1      +1 +1 +1 −1 | −12 dB |
| 5 | +1 +1 +1 −1 +1 | −14 dB |
| 7 | +1 +1 +1 −1 −1 +1 −1 | −16.9 dB |
| 11 | +1 +1 +1 −1 −1 −1 +1 −1 −1 +1 −1 | −20.8 dB |
| 13 | +1 +1 +1 +1 +1 −1 −1 +1 +1 −1 +1 −1 +1 | −22.3 dB |

Figure 10:
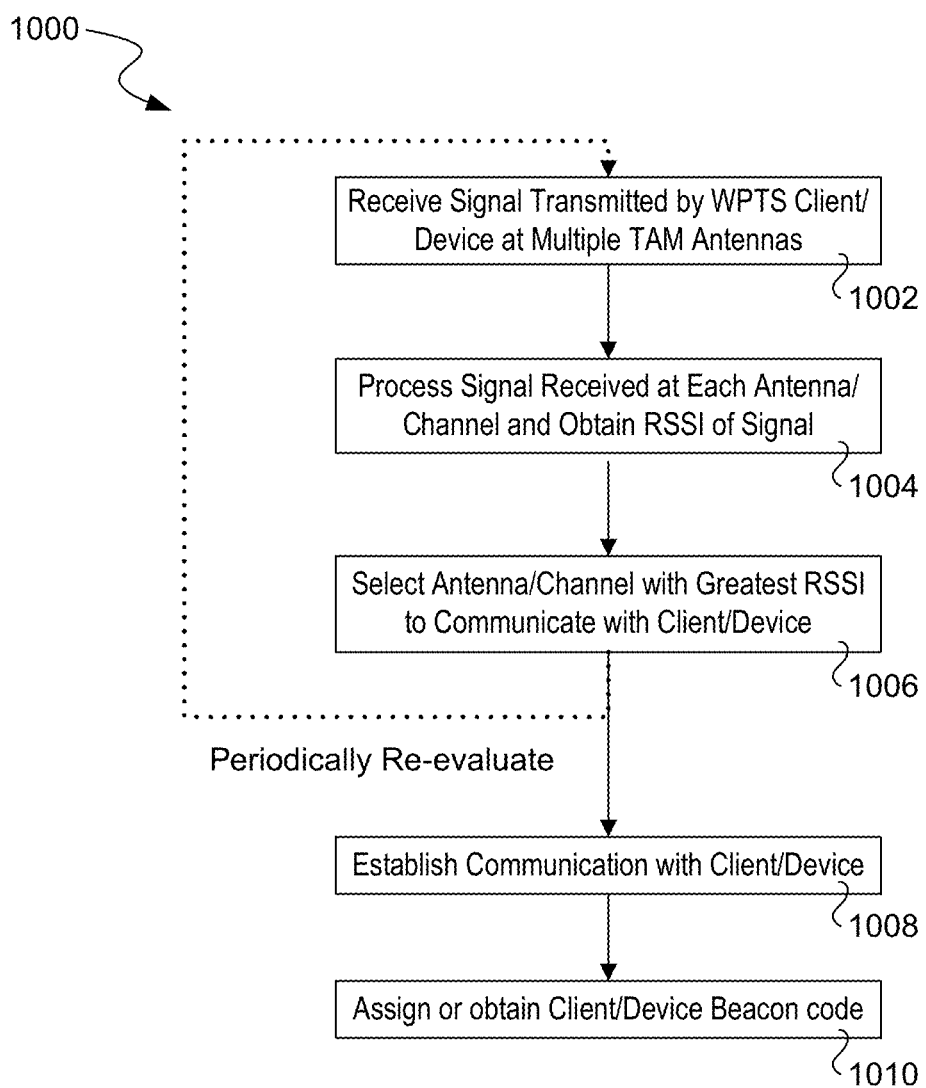
FIG. 10 is a flowchart illustrating operations for establishing communication with a wireless power receiver client and providing a code to be used by the client when broadcasting its encoded TAM beacon, according to one embodiment.

FIG. 10 shows a flowchart 1000 illustrating operations for establishing communication with a wireless power receiver client or host device and providing a code to be used by the client/device when broadcasting its encoded beacon. In a block 1002, a signal transmitted from a wireless power receiver client or host device is received at multiple of the TAM antennas. At this point, communication with the client/device has not been established; however, characteristics of the signals, such as signal strength, may be detected. Accordingly, in a block 1004 the signal is processed is processed using the RF receiver circuitry associated with each TAM antenna/channel, and the RSSI of the signal as received at each TAM antenna is obtained. In embodiments using an IEEE 802.11 transceiver chip that supports RSSI measurement, the RSSI can be obtained from an interface on the chip. Alternative, RSSI can be measured using any of various well-known schemes.

In a block 1006, the antenna/channel with the greatest RSSI is selected to be used for communication with the client or device. As shown by the dotted loop back to block 1002, the operations of blocks 1002, 1004, and 1006 may be periodically repeated to ensure the best communication channel is being used to communicate with the client/device. For example, since most of the devices expected to be powered by a WPTS are mobile devices, the location of such devices may change as a user (with the device) moves about within the charging range of a WPTS.

Once the antenna/channel is selected in block 1006, a communication session with the wireless power receiver client or host device is established in a block 1008. Establishment of a communication channel may be performed using various well-known schemes and/or protocols. For example, if the communication is with a wireless power receiver client chip or module, a standardized IEEE 802.11 protocol may be used in some embodiments, while other embodiments may use a proprietary protocol supported by both the wireless power receiver client and the TAM.

Once communication with the wireless power receiver client or host device is established, the beacon code to be used the wireless power receiver client for the TAM beacon is either assigned to the wireless power receiver client or obtained from the wireless power receiver client. In one embodiment using a wireless power receiver client chip or module, a TAM beacon code is pre-assigned to the chip/module, somewhat akin to a MAC address. As with MAC addresses, the TAM beacon code should be unique, such that no two wireless power receiver client chips/modules have the same TAM beacon code.

WPTS Tile with TAM

In some embodiments, the WPTS and TAM facilities are combined or otherwise integrated in a single component, referred to herein as a "tile." In one exemplary implementation of the WPTS tile, the tile is configured to replace a ceiling tile in the false ceiling of an office building, business, or other structure, hence the name "tile." Moreover, it is envisioned that multiple tiles will be used in some locations in a coordinated manner to provide WPTS coverage to large areas.

Figure 11:
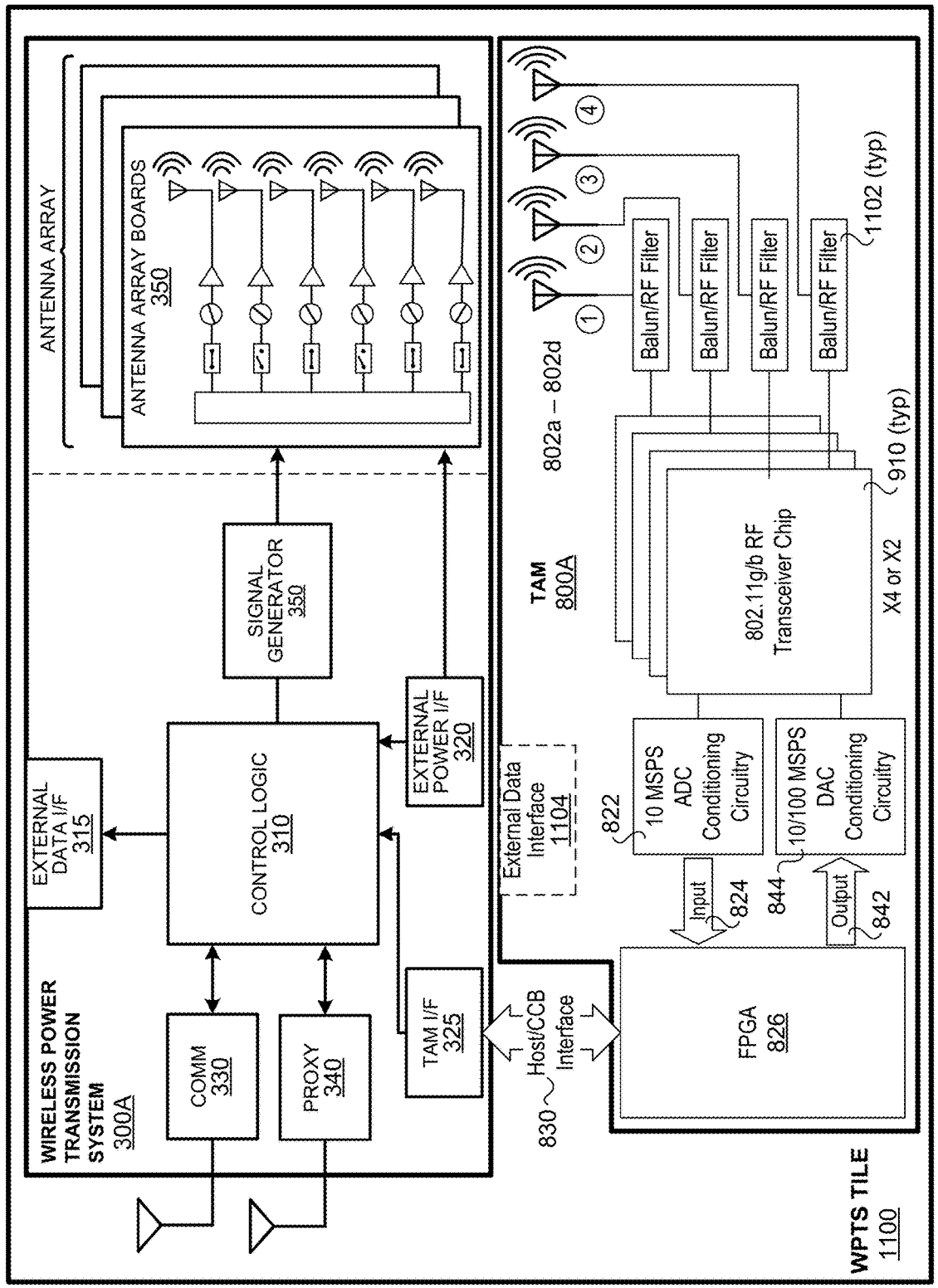
FIG. 11 is a schematic diagram of a WPTS tile including an integrated TAM, according to one embodiment.

FIG. 11 shows an exemplary embodiment of a WPTS tile 1100, which includes a WPTS 300A and a TAM 800A. WPTS 300A has a configuration similar to WPTS 300 illustrated in FIG. 3 and discussed above. TAM 800A has a configuration similar to TAM 800 of FIG. 8, combined with aspects of the circuitry of FIG. 9. For example, TAM 800A includes four antennas 802a-802d, each coupled to a respective set of RF circuitry similar to that shown in FIG. 9, depicted as Balun/RF Filter blocks 1102. In the illustrated embodiment, four 802.11g/b RF transceiver chips 910 are used, each coupled to a respective Balun/RF Filter block 1102. Optionally, two 802.11g/b RF transceiver chips configured to support antenna diversity using two antennas may be used. The remaining circuitry, including 10 MSPS ADC conditioning circuitry 822, FPGA 826, and 10/100 MSPS DAC conditioning circuitry 844 is the same as shown in TAM 800, and functions in a similar manner to that discussed above.

TAM 800A may further include an external data interface 1104, which is configured to facilitate communication with external components or systems. For example, external data interface 1104 may be a wireless interface such as an 802.11 Wi-Fi™ interface that enables TAM 800A to communication with other components or systems over a WLAN. Optionally, external data interface 1104 may be a wired interface, such as an Ethernet interface. In some embodiments, TAM 800A performs some communication with WPTS 300A using a wireless or wired out-of-band communication channel (not shown) using external data interfaces 1104 and 315. ("Out-of-band" is used to distinguish this communication channel from communication over host/CBB interface 830, which is an in-band communication channel.)

During operation of WPTS tile 1100, most WPTS operations are performed by WPTS 300A in a similar manner to that described above, including receiving beacons from wireless power receiver clients and transmitting wireless power signals to wireless power receiver clients using the antenna array board 350. However, rather than use a predetermined schedule for providing power signals to wireless power receiver clients (and in conjunction having the wireless power receiver clients perform beaconing in accordance with the predetermined schedule), power on demand is supported, whereby wireless power receiver clients may asynchronously request power and have those requests serviced by the WPTS by transmitting wireless power signals to the clients. Also, rather than receiving the requests for power using WPTS 300A, the requests in the form of encoded beacons transmitted from wireless power receiver clients are received and processed by TAM 800A, which extracts client ID information from encoded beacons and forward the client ID information in the form of a BEACON_DETECT_ID over Host/CCB interface 830. The BEACON_DETECT_ID is used by WPTS 300A to identify the wireless power receiver client requesting power, broadcast information to instruct or otherwise cause the wireless power receiver client to transmit a WPTS beacon, and using the WPTS beacon to adjust the phases of the wireless power receiver clients to direct wireless power transmission signals toward the beaconing wireless power receiver client.

Figure 12:
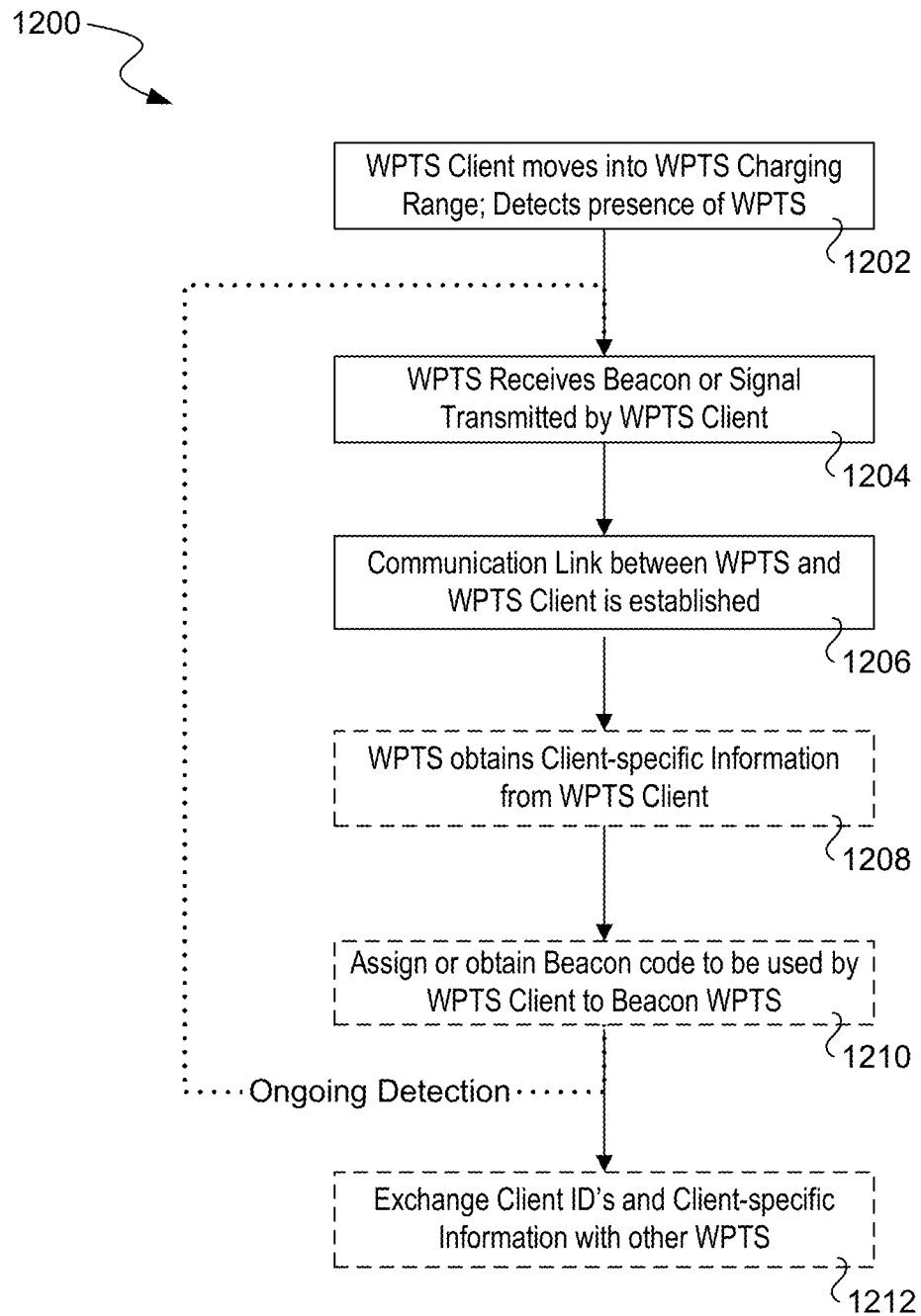
FIG. 12 is a flowchart illustrating operations performed to establish communication between a WPTS and a wireless power receiver client and associated configuration operations, according to one embodiment.

Prior to performing the foregoing, various communications between the WPTS, TAM, and wireless power receiver clients are first established, and various configuration information is exchanged. FIG. 12 shows a flowchart 1200 illustrating operations performed to establish communication between a WPTS and a wireless power receiver client and associated configuration operations, according to one embodiment. As discussed, in some embodiments, the wireless power transmission system may be used for wireless communication transmission waves, wireless power transmission waves, or dual-purpose data/power transmission waves.

The process begins in a block 1202 in which a wireless power receiver client move into the charging range of a WPTS, and detects presence of the WPTS. Detection or the WPTS can be performed using various means, such as a periodic beacon broadcast by the WPTS (for the purpose of advertising its presence). The wireless power receiver client may also determine that the signal strength of wireless power transmission system is above a signal strength range and therefore, that wireless power receiver client is within the charging range of wireless power transmission system 101.

In response to detecting it has moved into a WPTS charging range, the wireless power receiver client broadcasts a beacon of signal to initiate a handshake process that is used to establish communication with the WPTS, as depicted in a block 1204. In some embodiments, the wireless power receiver client will be preprogrammed to broadcast an encoded beacon and the WPTS will be configured to detect the encoded beacon. In other embodiments, a predetermined beacon format will be used for all wireless power receiver clients to initiate the handshake process.

In a block 1206, a communication link between the WPTS and wireless power receiver client is established. For example, if an encoded channel is to be used for communication between the WPTS and wireless power receiver client, a key exchange or the like may be employed to establish the keys for encoding communications of the encoded channel. In cases where the WPTS is configured to receive encoded beacons and/or signals from (previous) unknown wireless power receiver clients, the communication may be established without a key exchange.

In an optional block 1208, the WPTS obtains client-specific information from the wireless power receiver client. In some embodiments, the WPTS processes the encoded beacon signal received from the wireless power receiver client to identify client-specific information associated with the wireless power receiver client. In this manner, beacon signals from individual wireless power receiver clients can be identified.

Client-specific information may include various properties and/or requirements corresponding to a wireless power receiver client. For example, the client-specific information may include, but is not limited to, battery level of wireless power receiver client host device, battery usage information, temperature information, estimated distance to the WPTS, and information identifying other nearby wireless power transmission systems, currently providing power to wireless power receiver client, etc.

In some embodiments, initial data exchange between a WPTS and wireless power receiver client will be unencoded or otherwise use an encoded channel that is not specific to an individual client. Accordingly, in an optional block 1210 the WPTS assigns a beacon code to be used by the wireless power receiver client for future beaconing and/or to be used by the WPTS to convey a message or request to the wireless power receiver client. For example, in some embodiments a WPTS will broadcast a beacon that is encoded such that only a particular wireless power receiver client can decode and/or detect it. This is described in further detail below. In other embodiments, the wireless power receiver client will have a pre-programmed code that is provided to the WPTS in block 1210, or optionally is provided to the WPTS in block 1208 as part of the WPTS obtaining client-specific information.

As described above, in some embodiments multiple wireless power transmission systems are used in a cooperative manner to provide larger charging coverage areas. Accordingly, in an optional block 1212, wireless power receiver client ID's and client-specific information is exchanged with one or more other WPTS. In some embodiments, when a new client is detected by a given WPTS, the operations of blocks 1204, 1206, 1208, and 1210 will be performed, and the WPTS will communicate the client ID and client-specific information with one or more other WPTS in block 1212. Optionally, or in addition to, client ID's and client-specific information may be periodically exchanged.

In one embodiment, WPTS will maintain a management information base (MIB) or the like, which is distributed across all WPTS's in an overall system, and in which client ID's and associated client-specific information is stored for currently-active wireless power receiver clients. Optionally, the MIB may store client ID's and client-specific information for previous clients that are currently inactive. Under the MIB approach, when a currently-active client moves into the charging range of a second WPTS, rather than repeat the operations of block 1208 and/or 1210, the second WPTS can lookup the client-specific information and obtain the WPTS beacon that has already been assigned in its MIB.

Generally, the beacon signals may be encoded or modulated with a transmission configuration that is provided to selected clients in the wireless power delivery environment. The transmission configuration may be coherent signals determined by computing the complex conjugate of a received beacon (or calibration) signal at each antenna of the array such that the coherent signal is phased for delivering power. In some embodiments, a different transmission configuration is provided to each client or communication path. Different transmission configurations for each of multiple wireless power receiver clients within the charging range of a WPTS can facilitate simultaneous or near simultaneous transmission of beacon signaling by the clients in the wireless power delivery environment, while further ensuring that only authorized (selected) clients are "locked" by the wireless power delivery system.

Figure 13:
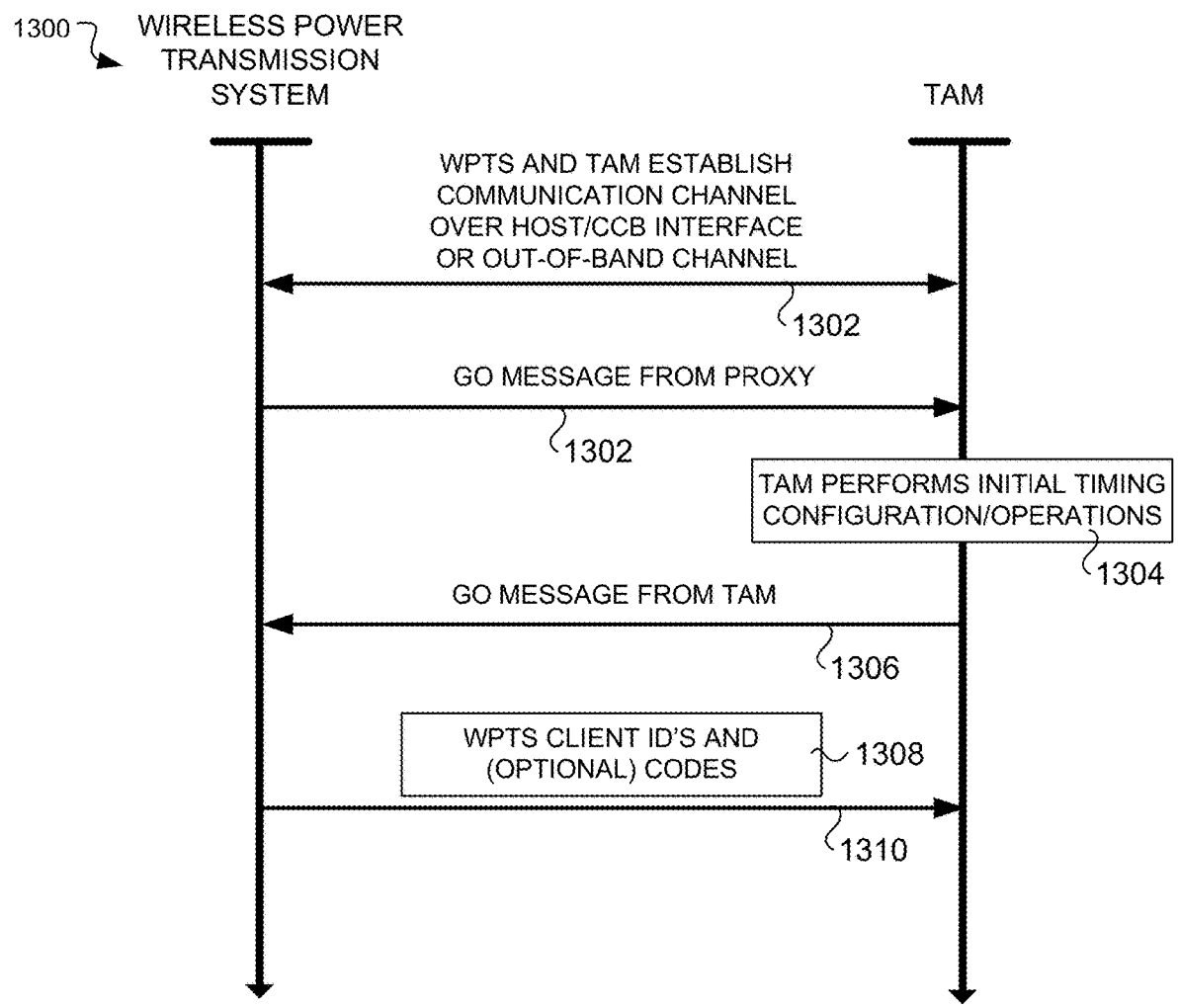
FIG. 13 is a message flow diagram illustrating messages that are exchanged between a WPTS and a TAM during initialization of a WPTS tile, according to one embodiment.

FIG. 13 shows a message flow diagram 1300 illustrating messages that are exchanged between a WPTS and a TAM during initialization of a WPTS tile, according to one embodiment. As depicted by a message exchange 1302, the WPTS and TAM establish a communication channel over either the host/CCB interface or using an out-of-band channel. As discussed above, examples of out-of-band channels include a wireless WLAN link, such as a Wi-Fi™ link, and a wired network link, such as an Ethernet link.

As depicted by a message 1302, the WPTS issues a GO MESSAGE FROM PROXY to the TAM. This message includes some coarse timing information. The TAM then performs some timing configuration and system initialization operations using the information in the GO MESSAGE FROM PROXY message, as depicted in a block 1304. Upon completion, the TAM returns a GO MESSAGE FROM TAM 1306 including finer timing information.

Either following the GO MESSAGE FROM TAM 1306 (as shown) or sometime prior thereto, the WPTS may send client ID's and optional codes 1308 to the TAM, as depicted by a message 1310. If both the WPTS and TAM are initialized at the same time, the WPTS will not have any clients, and thus may have no client ID's to send to the TAM. Optionally, under the foregoing MIB scheme, when a new WPTS is joined to a currently operating system including multiple WPTS, the new WPTS may obtain a copy of the MIB during initialization, and pass that information to the TAM. As yet another option, the MIB could be in shared memory that is accessible to both the WPTS and the TAM, enabling the TAM to access the client ID data without it being forwarded in one or more messages.

The wireless power receiver client ID information is used by the TAM to associate those client IDs with the wireless power receiver clients when the TAM is communicating with those wireless power receiver clients. In particular, when the BEACON_DETECT_ID in connection with a power request from a given wireless power receiver client will correspond to the client ID that was sent to the TAM with message 1310.

When the optional codes are included with message 1310, those codes may be used by the TAM for the encoded TAM beacon codes to be assigned to the wireless power receiver clients. In one embodiment, during the operations of flowchart 1200, the WPTS provides the codes to be used by the wireless power receiver client for beaconing to the WPTS, and beaconing to the TAM. As discussed above, under some embodiments that same beacon may be used (for both the WPTS and TAM), while for other embodiments separate beacons are used.

Figure 14:
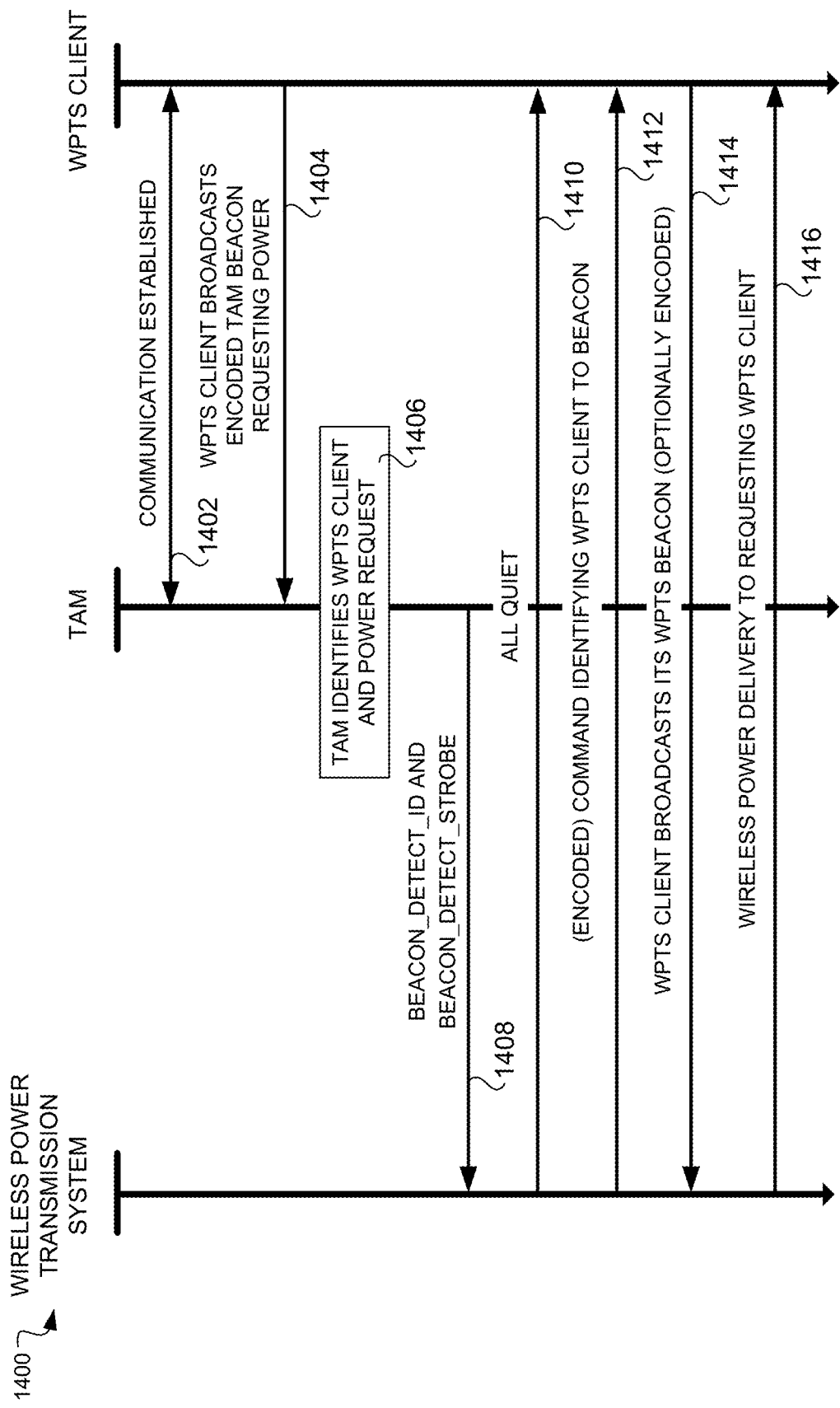
FIG. 14 is a message/signal flow diagram illustrating operations and message flows associated with implementation of a wireless power-on demand scheme, according to one embodiment.

FIG. 14 shows a message/signal flow diagram 1400 illustrating operations and message flows associated with implementation of a wireless power-on demand scheme, according to one embodiment. As depicted by message exchange 1402, the TAM and wireless power receiver client will have established communication, such as using the operations of flowchart 1000 shown in FIG. 10 and discussed above. At this point, the WPTS is configured to service power-on demand requests from the wireless power receiver client.

The request/service sequence begins with the wireless power receiver client broadcasting its encoded TAM beacon, as depicted by signal 1404. As depicted in a block 1406, the TAM will detect the encoded TAM beacon and identify the wireless power receiver client beaconing the encoded TAM beacon by decoding the beacon and looking up which wireless power receiver client is associated with the particular encoding.

Next, the TAM will place the BEACON_DETECT_ID bits corresponding to the wireless power receiver client ID on the BEACON_DETECT_ID bus 836 and activate the BEACON_DETECT_STROBE 838, as depicted by signal 1408. The BEACON_DETECT_STROBE is used to notify the WPTS that a client is requesting power, and the BEACON_DETECT_ID is used to identify the particular client.

At this point, the WPTS prepares to service the wireless power request for the client. There are various ways this may be accomplished, ultimately concluding with the WPTS antenna array being configured to send wireless power signals to the requesting client in the manner described above. Under some embodiments, the antenna array may be configured to automatically direct wireless power signals to a client based on signals received from the client, such as a beacon. Moreover, under some embodiments the directing of the wireless power signals is performed based on the beacon signal itself (i.e., the phase of the RF signal as received at the different antennas in the array), without use of any information encoded in the beacon. In other embodiments, the beacon is encoded and the coding is used to identify the particular client or for extracting characteristics of the beacon signal broadcast by the client. Knowledge of the client may be used for one or more of assisting in directing the wireless power signals to the client and tailoring the delivery of power to the client based on the client-specific information the WPTS previously acquired for the client.

Returning to FIG. 14, in some embodiments the WPTS broadcasts an ALL QUIET beacon to be received by any wireless power receiver client within its charging area. In some embodiments, one or more other WPTS may also broadcast an ALL QUIET beacon, such as under situations where the wireless power receiver client requesting power is within the charging range of multiple WPTS. The ALL QUIET beacon instructs the wireless power receiver clients not to beacon for a predetermined period of time (either beacon a WPTS beacon and/or TAM beacon). In connection with the ALL QUIET beacon, the WPTS broadcast a signal 1412 comprising a command instructing the wireless power receiver client requesting power to beacon its WPTS beacon. Generally, signal 1412 may be encoded such that it is decoded (and subsequently processed) only by the wireless power receiver client requesting power; when signal 1412 is received by any other wireless power receiver clients within the broadcast range of the WPTS, it is one or more of not detected or ignored.

In some embodiments the ALL QUIET signal 1410 and signal 1412 may be combined into a single WPTS beacon. Under this scenario, the beacon is received an processed by any wireless power receiver clients within the broadcast range of the WPTS, with all but the power requesting wireless power receiver client interpreting the beacon as a command to be quiet, while the power requesting wireless power receiver client interprets the beacon as command to broadcast its WPTS beacon.

In response to receiving signal 1412 (or the foregoing combined WPTS beacon), the wireless power receiver client request power broadcasts its WPTS beacon, as depicted by a signal 1414. As discussed above, the WPTS can detect phases in beacons received from wireless power receiver clients and direct wireless power signals towards those clients. Using this means, wireless power is delivered to service the wireless power receiver client power request, as depicted by a signal 1416. If the wireless power receiver client broadcasts an encoded WPTS beacon, the WPTS can decode the beacon to identify the wireless power receiver client and deliver power to the WPTS, potentially tailored to client-specific information for the wireless power receiver client.

In some embodiments, a wireless power receiver client will broadcast its encoded TAM beacon signal when it determines that its host device has a low battery level. For example, the wireless power receiver client may remain in sleep mode until it determines that the power level is below a threshold value. Wireless power receiver client may then wakeup and initiate the wireless power transmission sequence by broadcasting its encoded TAM beacon.

In other embodiments, a wireless power receiver client may broadcast it encoded TAM beacon signal in response to detecting it has moved within the charging range of a WPTS. For example, a wireless power receiver client may determine to initiate the wireless power transmission sequence by determining that the signal strength of signals received from a WPTS is above a signal strength range and therefore, that the user (of the wireless power receiver client host device) has roamed into the wireless power charging range of the WPTS.

Figure 15:
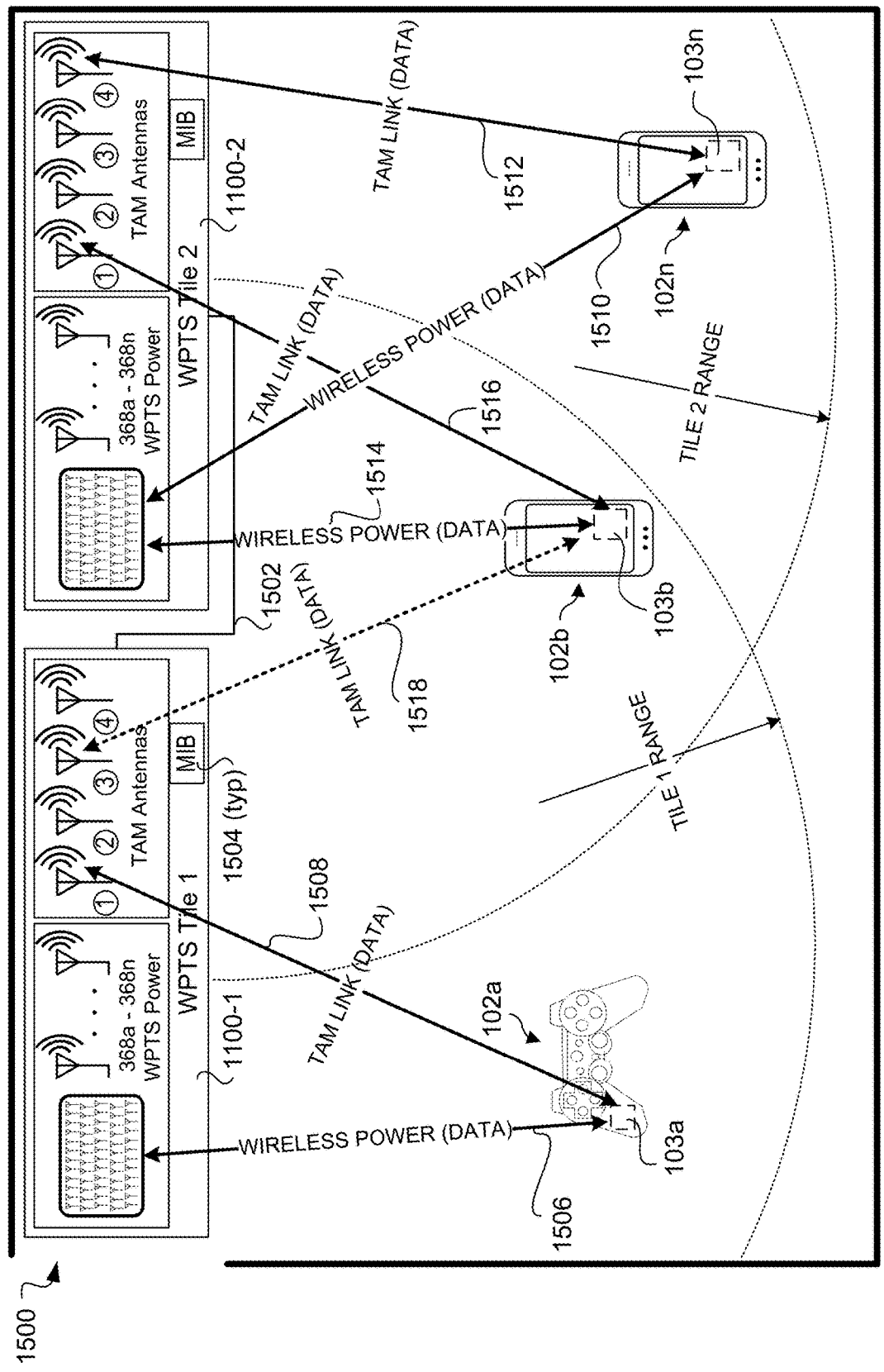
FIG. 15 is a schematic diagram of a wireless power delivery environment including two WPTS tiles providing power to wireless power receiver clients in three exemplary wireless devices.

FIG. 15 shows a wireless power delivery environment 1500 including two WPTS tiles 1100-1 and 1100-2, each configured in a similar manner to WPTS tile 1100 of FIG. 11 discussed above. WPTS tiles 1100-1 and 1100-2 are coupled in communication via a link 1502, which generally may be a wireless link (e.g., Wi-Fi™) or a wired link (e.g., Ethernet), although proprietary links may also be used. Each of WPTS tiles 1100-1 and 1100-2 also include a local instance of a management information base (MIB) 1504.

Each of WPTS tiles 1100-1 and 1100-2 has a respective charging range, as depicted by the arcs labeled TILE 1 RANGE and TILE 2 RANGE. Wireless device 102*a* including wireless power receiver client 103*a* is within the charging range of WPTS tile 1100-1, and wireless device 102*n* including wireless power receiver client 103*n* is within the charging range of WPTS tile 1100-2, while wireless device 102*b* including a wireless power receiver client 103*b* is within the charging range of both WPTS tile 1100-1 and WPTS tile 1100-2.

Wireless power receiver client 103*a* is configured to receive wireless power signals from WPTS tile 1100-1, as depicted by a WPTS signal path/link 1506, which may also support data communication between Wireless power receiver client 103*a* and the WPTS of WPTS tile 1100-1. Wireless power receiver client 103*a* is also configured to communicate with the TAM of WPTS tile 1110-1, as depicted by a TAM link 1508, which may also be used for data communication between Wireless power receiver client 103*a* and the TAM. Similarly, client 103*b* is configured to receive wireless power signals from WPTS tile 1100-1 via a WPTS signal path/link 1510, and is also configured to communicate with the TAM of WPTS tile 1110-2 via a TAM link 1512.

As mentioned, wireless device 102*b* and wireless power receiver client 103*b* is within the charging range of both WPTS tiles 1100-1 and 1100-2. Under an aspect of the distributed management scheme, one WPTS tile is selected to communicate with a wireless power receiver client 103*b* at a time. In the example illustrated in FIG. 15, that WPTS tile for wireless power receiver client 103*b* is WPTS tile 1100-2, as depicted by a WPTS signal path/link 1514. In addition, TAM operations for wireless power receiver client 103*b* are performed by the TAM in WPTS tile 1100-2, as depicted by a TAM link 1516.

In some embodiments, multiple TAMs on different WPTS tiles may concurrently be in communication with a given wireless power receiver client, as depicted by optional TAM link 1518. For example, this approach could be used to manage "handoff" of WPTS operations as a wireless power receiver client moves within overlapping charging ranges of WPTS tiles. In some embodiments, similar operations may be performed using WPTS data links (not shown), which would be used to enable concurrent communication with a wireless power receiver client by the WPTS in two or more WPTS tiles. However, as noted above, only one WPTS will provide power to a wireless power receiver client at any given point in time.

In some embodiments, the MIB 1504 instances are used to coordinate delivery of power to wireless power receiver clients as they roam within an environment with multiple WPTS tiles. For example, under one approach each WPTS tile has a local instance of an MIB containing information relating to all of the wireless power receiver clients currently being operated within the environment (as of a last distributed update). Updates to the distributed MIB may be performed periodically or in response to detected changes for a given WPTS tile. For example, WPTS tiles with overlapping ranges may periodically exchange MIB data, either exchanging their entire MIB data or using a delta scheme (e.g., change since the last period). Under an alternative approach, changes to the MIB data for local instances are propagated as wireless power receiver clients move within the overall environment, while observing that WPTS tiles with charging ranges that are not proximate to the location of a given wireless power receiver client that has recently moved may not have their MIB instances updated to reflect the move.

Through use of the local MIB instances, the overall system can coordinate which WPTS tile is currently providing power to each wireless power receiver client, as well as facilitate handover between the WPTS tiles. Also, coordinated operation of multiple WPTS tiles (typically two) having overlapping charging ranges in which a given wireless power receiver client is present may be performed. For example, consider the use of the ALL QUIET beacon or signal. When a given WPTS tile broadcasts an ALL QUIET beacon or signal in connection with providing power to a wireless power receiver client within the charging range of another WPTS tiles (i.e., the wireless power receiver client is within the overlapping charging ranges of the two WPTS tiles), the two WPTS tiles can be coordinated such that each tile issues an ALL QUIET beacon. In this manner, any other wireless power receiver clients within the overlapping charging range will be instructed not to beacon, and thus not cause RF interference with the WPTS beacon broadcast by the wireless power receiver client making the power request.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented, at least in part, by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for delivering wireless power from a wireless power transmission system (WPTS) to one or more wireless power receiver devices, comprising:

establishing communication between a timing acquisition module (TAM) of the WPTS and each of the one or more wireless power receiver devices in response to respective unique codes being assigned to the one or more wireless power receiver devices to facilitate respective broadcasts, using the respective unique codes, of encoded beacons by the one or more wireless power receiver devices;

receiving, by the TAM via a first group of antennas of the TAM that is different from a second group of antennas of the WPTS, an encoded beacon broadcast of an encoded beacon of the encoded beacons from a wireless power receiver device of the one or more wireless power receiver devices indicating that the wireless power receiver device has requested, via a power request, power, wherein the second group of antennas has been configured to transmit power to the one or more wireless power receiver devices;

decoding, by the TAM, the encoded beacon by extracting an identification of the wireless power receiver device from the encoded beacon;

providing, via a control interface between the TAM and the WPTS, a notification from the TAM to the WPTS referencing an identification of the wireless power receiver device and indicating that the wireless power receiver device has requested power; and based on the identification of the wireless power receiver device, transmitting, via the WPTS using the second group of antennas of the WPTS, wireless power signals to the wireless power receiver device to facilitate servicing of the power request.

2. The method of claim 1, wherein the WPTS uses the second group of antennas of the WPTS to receive signals from the one or more wireless power receiver devices.

3. The method of claim 2, wherein the encoded beacon has been broadcast using a signal defined by an Institute of Electrical and Electronics Engineers (IEEE) 802.11 based standard.

4. The method of claim 2, further comprising:

receiving signals transmitted from the one or more wireless power receiver devices at one or more antennas of the first group of antennas of the TAM;

determining, for the wireless power receiver device, an antenna of the one or more antennas that is receiving a signal of the signals having a signal strength that is higher than respective signal strengths of remaining signals of the signals; and using a channel associated with the antenna to communicate with the wireless power receiver device.

5. The method of claim 1, wherein the TAM is a first TAM, wherein the WPTS is a first WPTS including the first TAM that comprises a first charging range that is operating in a vicinity of a second WPTS that comprises a second TAM that comprises a second charging range that comprises a portion overlapping the first charging range, and wherein the method further comprises:

detecting that the wireless power receiver device is within the first and second charging ranges; and coordinating, between the first WPTS and the second WPTS, to determine which of the first WPTS and the second WPTS is to transmit wireless power signals to the wireless power receiver device.

6. The method of claim 1, wherein the encoded beacons have been encoded with respective codes comprising Barker code sequences.

7. The method of claim 1, wherein the wireless power receiver device is configured to broadcast a WPTS beacon to facilitate receiving wireless power signals from the WPTS, and wherein the encoded beacon is a first encoded beacon, and wherein the method further comprises:

broadcasting, by the WPTS, a second encoded beacon or a signal comprising a command directing the wireless power receiver device to broadcast the WPTS beacon.

8. The method of claim 7, wherein the signal is a first signal, and wherein the method further comprises:
broadcasting, from the WPTS, a beacon or a second signal comprising a command instructing wireless power receiver devices of the one or more wireless power receiver devices that have received the beacon or the second signal to withhold from transmitting any beacon for a predetermined amount of time.

9. The method of claim 1, further comprising:
assigning, by the WPTS, the respective unique codes to the one or more wireless power devices.

10. The method of claim 1, wherein the respective unique codes have been programmed into respective memory devices of the one or more wireless power receivers devices as pre-programmed codes, and wherein the method further comprises:
receiving, by the WPTS, the pre-programmed codes, wherein the transmitting of the wireless power signals comprises transmitting, based on a pre-programmed code of the pre-programmed codes, the wireless power signals to the wireless power receiver device to facilitate the servicing of the power request.

11. The method of claim 1, further comprising:
based on the encoded beacon, determining, by the WPTS, client-specific information corresponding to the wireless power receiver device comprising at least one of a battery level of the wireless power receiver device, temperature information corresponding to the wireless power receiver device, an estimated distance between the wireless power receiver device and the WPTS, or information representing another wireless power transmission system that has been providing power to the wireless power receiver device.

12. The method of claim 1, further comprising:
based on the encoded beacon, modifying, by the WPTS, a phase of a transmission of a wireless power signal of the wireless power signals.

13. A system, comprising:
a processor; and
a memory that stores executable instructions that, when executed by the processor, facilitate performance of operations, the operations comprising:
in response to assigning unique codes to respective wireless power receiver devices, receiving, by a timing acquisition module (TAM) of the system via a first group of antennas of the TAM that is different from a second group of antennas of the system, a broadcast from a wireless power receiver device of the respective wireless power receiver devices, wherein the broadcast comprises an encoded beacon that is based on a unique code of the unique codes that has been assigned to the wireless power receiver device, and wherein the broadcast represents that the wireless power receiver device has requested power;
in response to extracting, by the TAM, an identification of the wireless power receiver device from the encoded beacon, providing, via a control interface of the TAM and a system device of the system, a notification from the TAM to the system device that references the identification of the wireless power receiver device and that indicates that the wireless power receiver device has requested power; and
based on the identification of the wireless power receiver device, transmitting, via the system device using the second group of antennas, wireless power signals to the wireless power receiver device.

14. The system of claim 13, wherein the operations further comprise:
receiving, via the second group of antennas, beacons from the respective wireless power receiver devices.

15. The system of claim 13, wherein the operations further comprise:
receiving signals transmitted from the respective wireless power receiver devices at one or more antennas of the first group of antennas of the TAM;
determining, for the wireless power receiver device, an antenna of the one or more antennas that is receiving a signal of the signals having a signal strength that is higher than respective signal strengths of remaining signals of the signals; and
using a channel associated with the antenna to communicate with the wireless power receiver device.

16. The system of claim 13, wherein the wireless power receiver device is configured to broadcast a system beacon to the system device to facilitate receiving wireless power signals via the system device, wherein the encoded beacon is a first encoded beacon, and wherein the operations further comprise:
broadcasting, via the system device, a second encoded beacon or a signal comprising a command directing the wireless power receiver device to broadcast the system beacon.

17. The system of claim 16, wherein the signal is a first signal, and wherein the operations further comprise:
broadcasting, via the system device, a beacon or a second signal comprising a command instructing wireless power receiver devices of the respective wireless power receiver devices that have received the beacon or the second signal to withhold from transmitting any beacon for a predetermined amount of time.

18. The system of claim 13, wherein the operations further comprise:
assigning the unique codes to the respective wireless receiver power devices.

19. A non-transitory machine-readable medium, comprising executable instructions that, when executed by a processor of a power transmission system, facilitate performance of operations, comprising:
assigning unique codes to respective wireless power receiver devices of the power transmission system;
receiving, by a timing acquisition module (TAM) of the power transmission system via a first group of antennas of the TAM that is different from a second group of antennas of the power transmission system, a broadcast from a wireless power receiver device of the respective wireless power receiver devices, wherein the broadcast comprises an encoded beacon that is based on a unique code of the unique codes that has been assigned to the wireless power receiver device, and wherein the broadcast represents that the wireless power receiver device has requested power;
in response to extracting, by the TAM, an identification of the wireless power receiver device from the encoded beacon, providing, via a control interface of the TAM and a device of the power transmission system, a notification from the TAM to the device of the power transmission system that references the identification of the wireless power receiver device and that indicates that the wireless power receiver device has requested power; and
based on the identification of the wireless power receiver device, transmitting, via the power transmission system using the second group of antennas, wireless power signals to the wireless power receiver device.

20. The non-transitory machine-readable medium of claim 19, wherein the operations further comprise:
receiving signals transmitted from the respective wireless power receiver devices at one or more antennas of the first group of antennas of the TAM;
determining, for the wireless power receiver device, an antenna of the one or more antennas that is receiving a signal of the signals having a signal strength that is higher than respective signal strengths of remaining signals of the signals other than the signal; and
using a channel associated with the antenna to communicate with the wireless power receiver device.

* * * * *